(12) United States Patent
Kitahara et al.

(10) Patent No.: US 9,723,376 B2
(45) Date of Patent: Aug. 1, 2017

(54) INFORMATION PROCESSING APPARATUS, SERVER APPARATUS, INFORMATION PROCESSING METHOD, SERVER PROCESSING METHOD, AND PROGRAM

(71) Applicant: Sony Corporation, Tokyo (JP)

(72) Inventors: Jun Kitahara, Saitama (JP); Naohisa Kitazato, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/364,785

(22) PCT Filed: Nov. 8, 2012

(86) PCT No.: PCT/JP2012/007172
§ 371 (c)(1),
(2) Date: Jun. 12, 2014

(87) PCT Pub. No.: WO2013/094110
PCT Pub. Date: Jun. 27, 2013

(65) Prior Publication Data
US 2014/0331250 A1 Nov. 6, 2014

(30) Foreign Application Priority Data

Dec. 21, 2011 (JP) ................................. 2011-279850

(51) Int. Cl.
*H04N 7/16* (2011.01)
*H04N 21/438* (2011.01)
(Continued)

(52) U.S. Cl.
CPC ......... *H04N 21/8352* (2013.01); *G06F 21/51* (2013.01); *H04N 21/235* (2013.01);
(Continued)

(58) Field of Classification Search
CPC ............... H04L 9/3247; H04L 2209/60; H04L 2209/68; H04L 63/0042; H04L 63/12;
(Continued)

(56) References Cited

U.S. PATENT DOCUMENTS 7,627,762 B2 12/2009 Schaefer et al.
2003/0023770 A1 1/2003 Barmettler et al.
(Continued)

FOREIGN PATENT DOCUMENTS

JP 2003-058379 A 2/2003
JP 2005-526451 A 9/2005
(Continued)

OTHER PUBLICATIONS

Digital Hoso ni Okeru Application Jikko Kankyo Hyojun Kikaku ARIB STD-B23, edition 1. 2, Association of Radio Industries and Businesses, Jul. 29, 2009, pp. 41, 54 to 73, 103 to 104 (Partial English).

(Continued)

*Primary Examiner* — Pankaj Kumar
*Assistant Examiner* — Alazar Tilahun
(74) *Attorney, Agent, or Firm* — Lerner, David, Littenberg, Krumholz & Mentlik, LLP

(57) ABSTRACT

[Object] To improve the reliability of an application processed together with broadcast content.
[Solving Means] An application controller of an information processing apparatus acquires an application information table to which an electronic signature is attached and in which location information necessary for acquiring an application processed together with broadcast content is stored, and validates the electronic signature. The application controller can acquire the application based on the location information in a case of succeeding at least in the validation.

5 Claims, 19 Drawing Sheets

(51) Int. Cl.
    *H04N 21/8352* (2011.01)
    *H04N 21/235* (2011.01)
    *H04N 21/462* (2011.01)
    *H04N 21/4722* (2011.01)
    *G06F 21/51* (2013.01)
    *H04N 21/434* (2011.01)
    *H04N 21/8358* (2011.01)

(52) U.S. Cl.
    CPC ....... *H04N 21/4345* (2013.01); *H04N 21/462* (2013.01); *H04N 21/4722* (2013.01); *H04N 21/8358* (2013.01)

(58) Field of Classification Search
    CPC ............... H04N 21/84; H04N 21/8543; H04N 21/4345; H04N 21/23617; H04N 21/8166; H04N 21/235; H04N 21/2353; H04N 21/2362; H04N 21/2393
    See application file for complete search history.

(56) References Cited

U.S. PATENT DOCUMENTS

| | | | |
|---|---|---|---|
| 2003/0217369 A1* | 11/2003 | Heredia | H04N 7/162 725/152 |
| 2004/0162980 A1 | 8/2004 | Lesenne et al. | |
| 2005/0138401 A1* | 6/2005 | Terao | G06F 8/68 713/189 |
| 2005/0257059 A1* | 11/2005 | Schaefer et al. | 713/176 |
| 2007/0140650 A1 | 6/2007 | Suzuki | |
| 2011/0138164 A1* | 6/2011 | Cha | H04N 21/4432 713/2 |

FOREIGN PATENT DOCUMENTS

| | | |
|---|---|---|
| KR | 20080022805 A | 3/2008 |
| WO | 2011013303 A1 | 2/2011 |

OTHER PUBLICATIONS

ARIB STD-B23 Application Execution Engine Platform for Digital Broadcasting ARIB Standard ARIB STD-B23 1.2 Association of Radio Industries and Business, Jul. 29, 2009.

ETSI (European Telecommunications Standards Institute), "ETSI TS 102 796 V.1.1.1 (Jun. 2010)"http://www.etsi.org/deliver/etsi__ts/102700__102799/102796/01.01.01__60/ts__102796v010101p.pdf (browsed on Oct. 21, 2011).

Association of Radio Industries and Businesses, "Application Execution Engine Platform for Digital Broadcasting standard ARIB STD-B23 version 1.2", http://www.arib.or.jp/english/html/overview/doc/2-STD-B23v1__2.pdf (browsed on Oct. 21, 2011) (partial translation in English).

International Search Report from International Publication PCT/JP2012/007172 mailed Feb. 5, 2013.

Digital Hoso ni Okeru Application Jikko Kankyo Hyojun Kikaku ARIB STD-B23, edition 1. 2, Association of Radio Industries and Businesses, Jul. 29, 2009, pp. 41, 54 to 73, 103 to 104.

Extended European Search Report for EP Application No. 12859752.3, dated May 11, 2015.

Chinese Office Action for Chinese Application 201280061925.6, dated Mar. 2, 2016.

Japanese Office Action for Application No. 2013-550087 dated Sep. 6, 2016.

* cited by examiner

| application_information_section() { | No. of bits | Identifier |
|---|---|---|
| table_id | 8 | uimsbf |
| section_syntax_indicator | 1 | bslbf |
| reserved_future_use | 1 | bslbf |
| reserved | 2 | bslbf |
| section_length | 12 | uimsbf |
| test_application_flag | 1 | bslbf |
| application_type | 15 | uimsbf |
| reserved | 2 | bslbf |
| version_number | 5 | uimsbf |
| current_next_indicator | 1 | bslbf |
| section_number | 8 | uimsbf |
| last_section_number | 8 | uimsbf |
| reserved_future_use | 4 | bslbf |
| common_descriptors_length | 12 | uimsbf |
| for(i=0;i<N;i++){ | | |
| descriptor() | | |
| } | | |
| reserved_future_use | 4 | bslbf |
| application_loop_length | 12 | uimsbf |
| for(i=0;i<N;i++){ | | |
| application_identifier() | | |
| application_control_code | 8 | uimsbf |
| reserved_future_use | 4 | bslbf |
| application_descriptors_loop_length | 12 | uimsbf |
| for(j=0;j<N;j++){ | | |
| descriptor() | | |
| } | | |
| } | | |
| CRC_32 | 32 | rpchof |
| } | | |

FIG.2

| Field | | | Description |
|---|---|---|---|
| appName | | | Application name |
| applicationIdentifier | | | ID for uniquely identifying application |
| applicationDescriptor | | | General-purpose descriptor common to applications |
| | type | | Designate application type |
| | controlCode | | Designate value of application_control_code |
| | visibility | | Designate visibility of application |
| | serviceBound | | Flag indicating validity in only current service |
| | priority | | Indicate priority of application |
| | version | | Version of application |
| | mhpVersion | | Version conforming to platform profile |
| | icon | | Designate icon |
| | storageCapability | | Capability of storage function |
| applicationTransport | | | Transport protocol descriptor |
| applicationLocation | | | Application location descriptor |
| applicationBoundary | | | Application boundary descriptor |
| applicationSpecificDescriptor | | | Application specific descriptor |
| applicationUsageDescriptor | | | Application usage descriptor |
| applicationModeDescriptor | | | Descriptor indicating mode of application Executable function etc. differ depending on mode of application |
| applicationHashDescriptor | | | Hash value of application |

FIG.3

22 application mode descriptor

| application_mode_descriptor() { | No. of Bits | Identifier |
|---|---|---|
| descriptor_tag | 8 | uimsbf |
| descriptor_length | 8 | uimsbf |
| application_mode | 8 | uimsbf |
| } | | |

23 application hash descriptor

| application_hash_descriptor() { | No. of Bits | Identifier |
|---|---|---|
| descriptor_tag | 8 | uimsbf |
| descriptor_length | 8 | uimsbf |
| hash_algorithm | 8 | uimsbf |
| hash_value_length | 8 | uimsbf |
| for(i=0; i<N; i++) { | | |
| hash_value_byte | 8 | uimsbf |
| } | | |
| } | | |

FIG.4

| Code | Identification name | Meaning |
|---|---|---|
| 0x00 | | reserved_future_use |
| 0x01 | AUTOSTART | When service is selected, application is automatically activated (except for case where application is already in execution). |
| 0x02 | PRESENT | While service is being selected, application is in executable state but is not automatically activated. |
| 0x03 | DESTROY | Application terminates processing. |
| 0x04 | KILL | Application immediately terminates processing. |
| 0x05 | PREFETCH | Application file group is cached if receiver is available. Application is not started. |
| 0x06 | REMOTE | Indicate that application is not in current transport stream and can be acquired when channel of different stream is selected. |
| 0x07 | DISABLED | Indicate that application is incapable of being activated. |
| 0x08 | PLAYBACK_AUTOSTART | When receiver executes reproduction from storage device, application is activated as in AUTOSTART |
| 0x09 to 0xFF | | reserved_future_use |

FIG.5

INFORMATION PROCESSING APPARATUS, SERVER APPARATUS, INFORMATION PROCESSING METHOD, SERVER PROCESSING METHOD, AND PROGRAM

CROSS-REFERENCE TO RELATED APPLICATION

The present application is a national phase entry under 35 U.S.C. §371 of International Application No. PCT/JP2012/007172 filed Nov. 8, 2012, published on Jun. 27, 2013 as WO 2013/094110 A1, which claims priority from Japanese Patent Application No. JP 2011-279850 filed in the Japanese Patent Office on Dec. 21, 2011.

TECHNICAL FIELD

The present technology relates to an information processing apparatus capable of executing an application associated with broadcast content by using an application management table, a server apparatus that performs a service of supplying an application management table, and an information processing method, a server processing method, and a program that are associated with those apparatuses.

BACKGROUND ART

In recent years, there is known a technology capable of executing an application delivered via a network such as the Internet simultaneously with the reproduction of broadcast content. As such a technology, a technology called Hybrid Broadcast Broadband TV (hereinafter, referred to as HbbTV) is known. As the standard of the HbbTV, "ETSI TS 102 796" (see Non-patent Document 1) is developed in Europe. Additionally, also in Japan, a standard "ARIB STD-B23" (see Non-patent Document 2) according to the "ETSI TS 102 796" is developed.

Non-patent Document 1: ETSI (European Telecommunications Standards Institute), "ETSI TS 102 796 V1.1.1 (2010-06)", http://www.etsi.org/deliver/etsi_ts/102700_102799/10279 6/01.01.01_60/ts_102796v010101p.pdf (browsed on Oct. 21, 2011)

Non-patent Document 2: Association of Radio Industries and Businesses, "Application Execution Engine Platform for Digital Broadcasting standard ARIB STD-B23 version 1.2", http://www.arib.or.jp/english/html/overview/doc/2-STD-B23v1_2.pdf (browsed on Oct. 21, 2011)

SUMMARY OF INVENTION

Problem To Be Solved By The Invention

For example, in a system in which an application is executed simultaneously with the reproduction of broadcast content, such as the HbbTV, a life cycle from the activation to the end of the application is managed by a data structure called AIT (Application Information Table) section that is superimposed on the broadcast content. An information terminal that has acquired an AIT section controls the application based on an application control code included in the AIT section.

Further, an XML-AIT that is an AIT section described in an XML format is exemplified as a format that includes information equivalent to a broadcast AIT section and is optimal to provide information on the application to a receiver by using a communication network such as the Internet.

However, the XML-AIT is a file provided over the Internet and thus it can be said that the XML-AIT is exposed to a risk such as a falsification by a malicious third party. When the XML-AIT is falsified, there arise possibilities that a user is leaded to download an application of an unintended application server, the control of an application different from a normal one is executed, and the like.

Further, many applications can use various functions such as receiving a program or data from broadcast and presenting the program or data. However, in order to prevent some functions that can be used by such applications from being used, a huge amount of time and effort is required, e.g., the applications themselves are modified, and the like.

In view of the circumstances as described above, it is an object of the present technology to provide an information processing apparatus, a server apparatus, an information processing method, a server processing method, and a program that are capable of improving the reliability of an application.

Means For Solving The Problem

To solve the problems described above, according to the present technology, there is provided an information processing apparatus including: a broadcast content processing unit that receives and processes broadcast content; and a controller that is capable of acquiring an application information table to which an electronic signature is attached and in which location information necessary for acquiring an application processed together with the broadcast content is stored, validating the electronic signature, and acquiring the application based on the location information in a case of succeeding at least in the validation.

In the application information table, a first representative value that is calculated from the application by a predetermined calculation and represents the application may be stored, and the controller may calculate a second representative value for the acquired application, the second representative value representing the application by the predetermined calculation, and may compare the first representative value and the second representative value to validate the application.

In the application information table, mode information may be stored, and the controller may control a function available to the application based on the mode information described in the application information table.

The controller may determine whether the validation of the electronic signature is required or not based on the mode information described in the application information table.

According to the present technology, there is provided a server apparatus including a generation unit that generates an application information table to which an electronic signature is attached and in which location information necessary for causing an information processing apparatus to acquire an application processed together with broadcast content is stored, and responds in response to an acquisition request for the application information table from the information processing apparatus.

The generation unit may add a first representative value to the application information table, the first representative value being calculated from the application by a predetermined calculation and representing the application.

The generation unit may add mode information to the application information table, the mode information controlling a function available to the application.

According to the present technology, there is provided an information processing method including: by a controller, acquiring an application information table to which an electronic signature is attached and in which location information necessary for acquiring an application processed together with broadcast content is stored; validating the electronic signature; and acquiring the application based on the location information in a case of succeeding at least in the validation.

According to the present technology, there is provided a server processing method including: generating, by a generation unit, an application information table to which an electronic signature is attached and in which location information necessary for causing an information processing apparatus to acquire an application processed together with broadcast content is stored; and responding in response to an acquisition request for the application information table from the information processing apparatus.

According to the present technology, there is provided a program causing a computer to function as: a broadcast content processing unit that receives and processes broadcast content; and a controller that is capable of acquiring an application information table to which an electronic signature is attached and in which location information necessary for acquiring an application processed together with the broadcast content is stored, validating the electronic signature, and acquiring the application based on the location information in a case of succeeding at least in the validation.

EFFECT OF THE INVENTION

As described above, according to the present technology, it is possible to improve the reliability of an application.

BRIEF DESCRIPTION OF DRAWINGS

FIG. 2 is a diagram showing the data structure of an AIT section.

FIG. 3 is a diagram showing the data structure of an XML-AIT.

FIG. 4 is a diagram showing the data structures of an application mode descriptor and an application hash descriptor.

FIG. 5 is a diagram showing the definitions of application control codes designated by the AIT section and the XML-AIT.

MODE(S) FOR CARRYING OUT THE INVENTION

Hereinafter, an embodiment of the present technology will be described with reference to the drawings.
<First Embodiment>
[Information Processing System]

Figure 1:
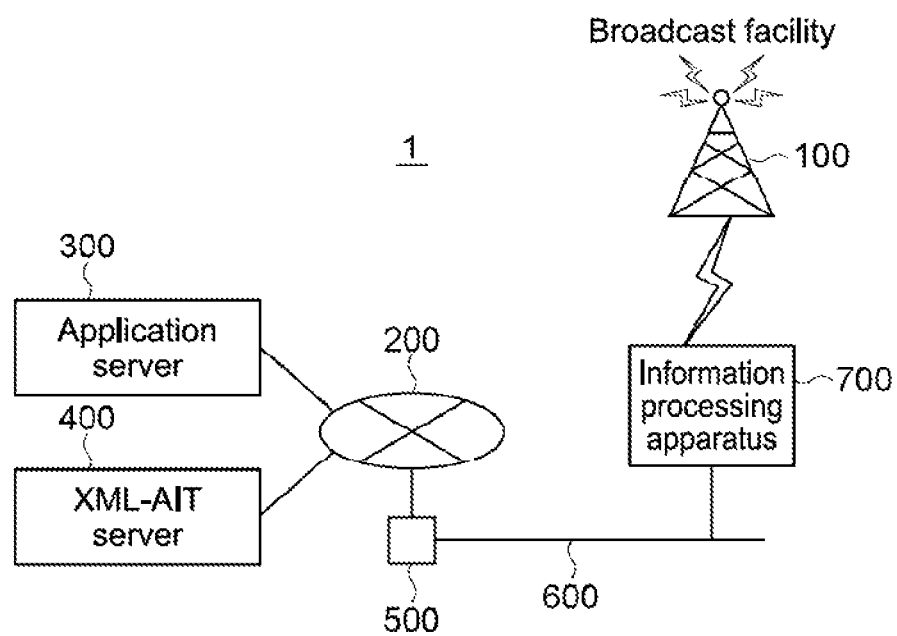
FIG. 1 is a diagram showing the general outline of an information processing system of this embodiment.

FIG. 1 is a diagram showing the general outline of an information processing system of this embodiment.

An information processing system 1 of this embodiment includes a broadcast facility 100, a first network 200 such as the Internet, an application server 300, an XML-AIT server 400, an edge router 500, a second network 600 such as a LAN (Local Area Network), and an information processing apparatus 700.

The broadcast facility 100 transmits a digital broadcast signal via, for example, communication media such as ground waves, satellite waves, and an IP (Internet Protocol) network. The broadcast facility 100 sends an AV stream, into which streams of videos, voices, subtitles, and the like are multiplexed, and a so-called broadcast stream, on which data accompanying the AV stream and the like are superimposed. The data accompanying the AV stream includes markup languages such as HTML and BML, an application described in a scripting language such as a Java (registered trademark) script, an AIT (Application Information Table) section constituted of information for managing an application, and the like. Here, an application that is broadcast by the broadcast facility 100 is referred to as a "broadcast application".

The application server 300 is capable of being connected to the first network 200 and provides an application, which is processed together with the broadcast stream, to the information processing apparatus 700 via the first network 200. Here, the application processed together with the broadcast stream includes a broadcast-linking-type application that is associated with broadcast content and a broadcast-unlinking-type application that is not associated with the broadcast content. The broadcast-linking-type application is an application capable of being presented by acquiring various resources such as a program and data from broadcast. On the other hand, the broadcast-unlinking-type application is not associated with the broadcast content and thus is an application that does not access a broadcast resource.

The XML-AIT server 400 is capable of being connected to the first network 200 and delivers an XML (Extensible Markup Language)-AIT for managing an application provided from the application server 300 to the information processing apparatus 700 via the first network 200.

It should be noted that the application server 300 and the XML-AIT server 400 may be one server.

The edge router 500 is a router for connecting the first network 200 and the second network 600. The second network 600 may be wired or wireless.

The information processing apparatus 700 is, for example, a personal computer, a mobile phone, a smartphone, a television apparatus, a game device, a tablet terminal, an audio-video reproduction device, or the like, but a specific product form is not determined.

The information processing apparatus 700 receives the digital broadcast signal from the broadcast facility 100 and modulates the digital broadcast signal to acquire a transport stream. The information processing apparatus 700 can separate a broadcast stream from this transport stream and decode the broadcast stream to be output to a display unit (not shown) and a speaker unit (not shown), or a recording apparatus (not shown) connected to the information processing apparatus 700.

It should be noted that each of the display unit, the speaker unit, and the recording apparatus may be incorporated in the information processing apparatus 700 or may be connected, as devices independent from each other, to the information processing apparatus 700 directly or via the second network 600. Alternatively, a device (not shown) including the display unit and the speaker unit may be connected to the information processing apparatus 700 directly or via the second network 600.

Further, the information processing apparatus 700 can extract an application and PSI/SI (Program Specific Information/Service Information) including the AIT section from the acquired transport stream and interpret the AIT section to perform control of the application. In the case where the application is a visible application, the information processing apparatus 700 can combine a video signal generated by the execution of this application with video and subtitle signals of the broadcast content described above to be output to the display unit.

Furthermore, the information processing apparatus 700 can acquire an application from the application server 300 via the first network 200, the edge router 500, and the second network 600. Similarly, the information processing apparatus 700 can acquire a file of the XML-AIT from the XML-AIT server 400. The information processing apparatus 700 can interpret the acquired XML-AIT to perform control on the application acquired from the application server 300 or the application acquired via the broadcast.

[Application]

Here, the application will be described. The application is provided from the broadcast facility 100 and the application server 300 to the information processing apparatus 700. The application is constituted of, for example, an HTML (Hyper Text Markup Language) document, a BML (Broadcast Markup Language) document, an MHEG (Multimedia and Hypermedia information coding) document, a Java (registered trademark) script, a still-image file, and a moving-image file.

The application may be visible or invisible. A visible application is an application whose state can be seen by a user through a screen. An invisible application is an application whose state cannot be seen by the user through the screen. For example, an application used when a browser is being activated in a transparent state that is invisible to the user, an application to record a viewing time or information for specifying broadcast content viewed in the information processing apparatus and to deliver such viewing time and information to a specific server for the purpose of a rating survey or the like, and the like are conceived.

Further, the application may be a bi-directional-type application capable of changing presented information or function according to an operation of the user of the information processing apparatus 700 or may be an application for uni-directionally presenting information to the user.

Furthermore, the application includes a broadcast-linking-type application that is linked with the broadcast content and a broadcast-unlinking-type application that is not linked with the broadcast content.

[Data Structures of AIT Section and XML-AIT]

Here, the data structure of the AIT transmitted as the AIT section from the broadcast facility 100 and the data structure of the XML-AIT provided from the application server 300 will be described. It should be noted that when this specification describes "AIT" simply, it means the AIT transmitted as the AIT section from the broadcast facility 100.

FIG. 2 is a diagram showing the data structure of the AIT of this embodiment.

The AIT is a table in which various types of information on applications, application control codes for controlling applications, and the like are stored. Specifically, the AIT stores a table ID, a section syntax indicator, a section length, an application form, a version number, a current next indicator, a section number, a last section number, a common descriptor loop length, an application information loop length, an application identifier, an application control code 11, an application descriptor loop length, an application descriptor, and the like.

FIG. 3 is a diagram showing the data structure of the XML-AIT of this embodiment.

The XML-AIT stores, for each application, an application name, an application identifier, an application descriptor, an application type, an application control code 21, an application visibility, a flag indicating validity in only a current service, an application priority, an application version, a version conforming to a platform profile, an icon, a storage function capability, a transport protocol descriptor, an application location descriptor, an application boundary descriptor, an application specific descriptor, an application usage descriptor, an application mode descriptor 22, an application hash descriptor 23, and the like.

An electronic signature for detecting a falsification is attached to the XML-AIT. As the electronic signature, for example, an XML signature is used. The form of the XML signature may be any of a detached signature that is independent from the XML-AIT, an enveloping signature having the form containing the XML-AIT, and an enveloped signature having the form contained in the XML-AIT. It should be noted that in order to suppress the influence on the format of the XML-AIT, it may be desirable to adopt the detached signature.

An application controller 708 of the information processing apparatus 700 validates the XML signature according to a procedure of a core validation including a reference validation and a signature validation.

The reference validation is a method of applying a normalization transformation process (Transform) and a digest calculation algorithm (DigestMethod) to a resource (XML-AIT) and thus validating a digest value (DigestValue) of a reference (Reference). When a result obtained by the reference validation and a registered digest value (DigestValue) are compared with each other and do not coincide with each other, the validation fails.

The signature validation is a method of serializing a signature information (SignatureInfo) element by a normalization method designated by an XML normalization algorithm (CanonicalizationMethod), acquiring key data by using key information (KeyInfo) and the like, and validating a signature by using a method designated by a signature algorithm (SignatureMethod).

In the above-mentioned data structure of the XML-AIT, the application mode descriptor 22 and the application hash descriptor 23 are information newly implemented from the system according to the embodiment of the present technology.

FIG. 4 is a diagram showing the data structures of the application mode descriptor 22 and the application hash descriptor 23.

The application mode descriptor 22 is constituted of a descriptor tag for identifying the application mode descriptor 22, a descriptor length, an application mode indicating the mode of an application, and the like.

The application mode is information for controlling a function (API: Application Program Interface) that is available to the application. As a function whose use is limited depending on the application, for example, a broadcast resource presenting function of accessing and presenting various broadcast resources such as broadcast programs and data is exemplified. More specifically, the broadcast-linking-type application is provided with a value of the application mode, which is set so as to be capable of using the broadcast resource presenting function, and the broadcast-unlinking-type application that is not related to (not linked with) broadcast is provided with a value of the application mode, which is set so as to be incapable of using the broadcast resource presenting function. It should be noted that the function of switching between availability and unavailability depending on the application mode is not limited to the broadcast resource presenting function.

Here, it is assumed that the application mode that is set for the broadcast-linking-type application is "mode 1" and the application mode that is set for the broadcast-unlinking-type application is "mode 2".

In this assumption, the application mode can be used as information for knowing whether the validation of the electronic signature is required or not in the information processing apparatus. That is, when the application mode is the "mode 1", the information processing apparatus determines that the validation of the electronic signature is not required, and when the application mode is the "mode 2", the information processing apparatus determines that the validation of the electronic signature is required. However, this is merely one operation form, and it may be possible to determine that the validation of the electronic signature is also required for the broadcast-linking-type application.

The application hash descriptor 23 is constituted of a descriptor tag, a descriptor length, a hash algorithm indication a calculation method for a hash value, a hash value length, a hash value, and the like. The hash value is a hash value of the application and a value generated from the substance of the application by a predetermined hash function and the like, and it can be said that the hash value is a value that represents the application. The method of using the hash value will be described later.

[Definition of Application Control Code]

The life cycle of the application is dynamically controlled by the information processing apparatus 700 based on the application control codes 11 and 21 stored in the AIT section and the XML-AIT, respectively.

FIG. 5 is a diagram showing the definitions of the application control codes 11 and 21 stored in the AIT section and the XML-AIT.

As shown in the figure, as the application control codes, "AUTOSTART", "PRESENT", "DESTROY", "KILL", "PREFETCH", "REMOTE", "DISABLED", and "PLAYBACK_AUTOSTART" exist in the standard. The definitions of those application control codes are as follows.

The "AUTOSTART" is a code of an instruction to automatically activate the application along with the selection of a service. This is not applied to the case where the application is already in execution.

The "PRESENT" is a code of an instruction to make the application in an executable state while the service is being selected. However, the target application is not automatically activated along with the selection of a service and is activated when an activation instruction is received from the user.

The "DESTROY" is a code of an instruction to permit the termination of the application.

The "KILL" is a code of an instruction to force-quit the application.

The "PREFETCH" is a code of an instruction to perform caching of the application.

The "REMOTE" is a code indicating an application that cannot be acquired in the current transport stream. Such an application can be acquired from a different transport stream or cache to be used.

The "DISABLED" is a code indicating the prohibition of the activation of the application.

The "PLAYBACK_AUTOSTART" is a code for activating an application along with the reproduction of broadcast content recorded in storage (recording apparatus).

[Configuration of First Information Processing Apparatus]

Figure 6:
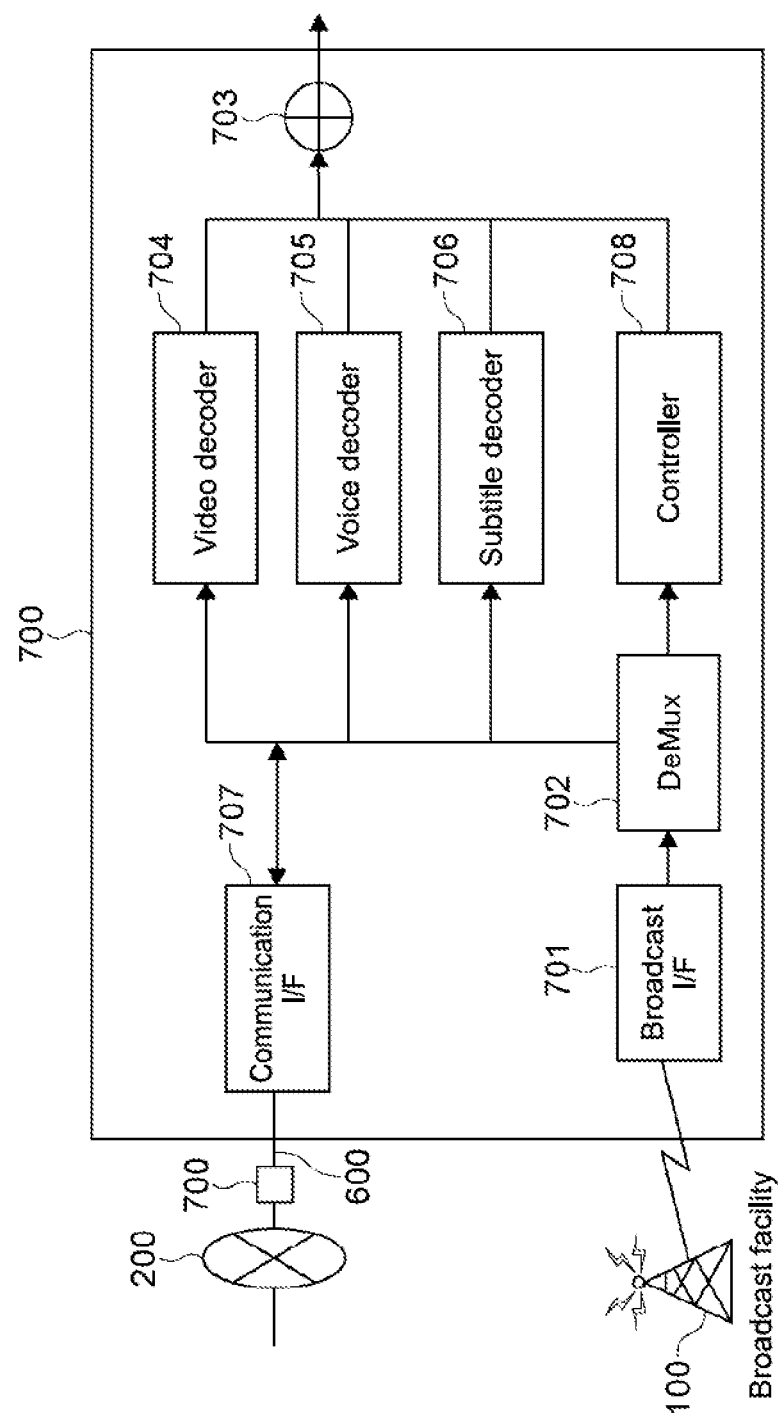
FIG. 6 is a block diagram showing the configuration of the information processing apparatus of this embodiment.

FIG. 6 is a block diagram showing the configuration of the information processing apparatus 700 of this embodiment.

The information processing apparatus 700 includes a broadcast interface 701, a demultiplexer 702, an output processing unit 703, a video decoder 704, a voice decoder 705, a subtitle decoder 706, a communication interface 707, and an application controller 708 (controller).

The broadcast interface 701 includes an antenna and a tuner and receives a signal of digital broadcast whose channel is selected by the user using those antenna and tuner. The broadcast interface 701 outputs a transport stream to the demultiplexer 702. The transport stream is obtained by performing demodulation processing or the like on the received digital broadcast signal.

The demultiplexer 702 separates a stream packet of the broadcast content, a packet of the application, and a packet of the AIT section from the transport stream. The demultiplexer 702 separates a video ES (Elementary Stream), a voice ES, and a subtitle ES from the stream packet of the broadcast content. The demultiplexer 702 distributes the video ES to the video decoder 704, the voice ES to the voice decoder 705, the subtitle ES to the subtitle decoder 706, and the packet of the application and the packet of the PSI/SI including the AIT section to the application controller 708.

The video decoder 704 decodes the video ES to generate a video signal and outputs the generated video signal to the output processing unit 703. The voice decoder 705 decodes the voice ES to generate a voice signal and outputs the generated voice signal to the output processing unit 703.

The subtitle decoder 706 decodes the subtitle ES to generate a subtitle signal and outputs the generated subtitle signal to the output processing unit 703.

The broadcast interface 701, the demultiplexer 702, the output processing unit 703, the video decoder 704, the voice decoder 705, and the subtitle decoder 706 correspond to a broadcast content processing unit that receives and processes the broadcast content.

The communication interface 707 is an interface for communicating with an external device via the second network 600 such as a LAN. The communication interface 707 may perform wireless or wired communication.

The application controller 708 is a controller that performs processing on the control of the application.

The output processing unit 703 combines the video signal from the video decoder 704, the voice signal from the voice decoder 705, the subtitle signal from the subtitle decoder 706, and the video signal, the voice signal, and the like from the application controller 708 with one another and outputs the resultant signal to a recording apparatus (not shown), and a display unit and a speaker unit (not shown), which are connected to the information processing apparatus 700.

A part or the whole of the configuration including at least the application controller 708 of the information processing apparatus 700 described above can be provided by a computer including a CPU (Central Processing Unit) and a memory and a program.

[Operation of Information Processing System 1]

Next, the operation of the information processing system 1 of this embodiment will be described.

The operation will be described in the following order.

1. Activation of Application by Using AIT Section
2. Activation of Application by Using XML-AIT
3. Activation of Application from Broadcast BML Data
4. Activation of Broadcast-unlinking-type Application
5. Activation of Broadcast-unlinking-type Application from Application Launcher
6. Generation and Validation of Electronic Signature and Hash Value (1. Activation of Application by Using AIT Section)

Figure 7:
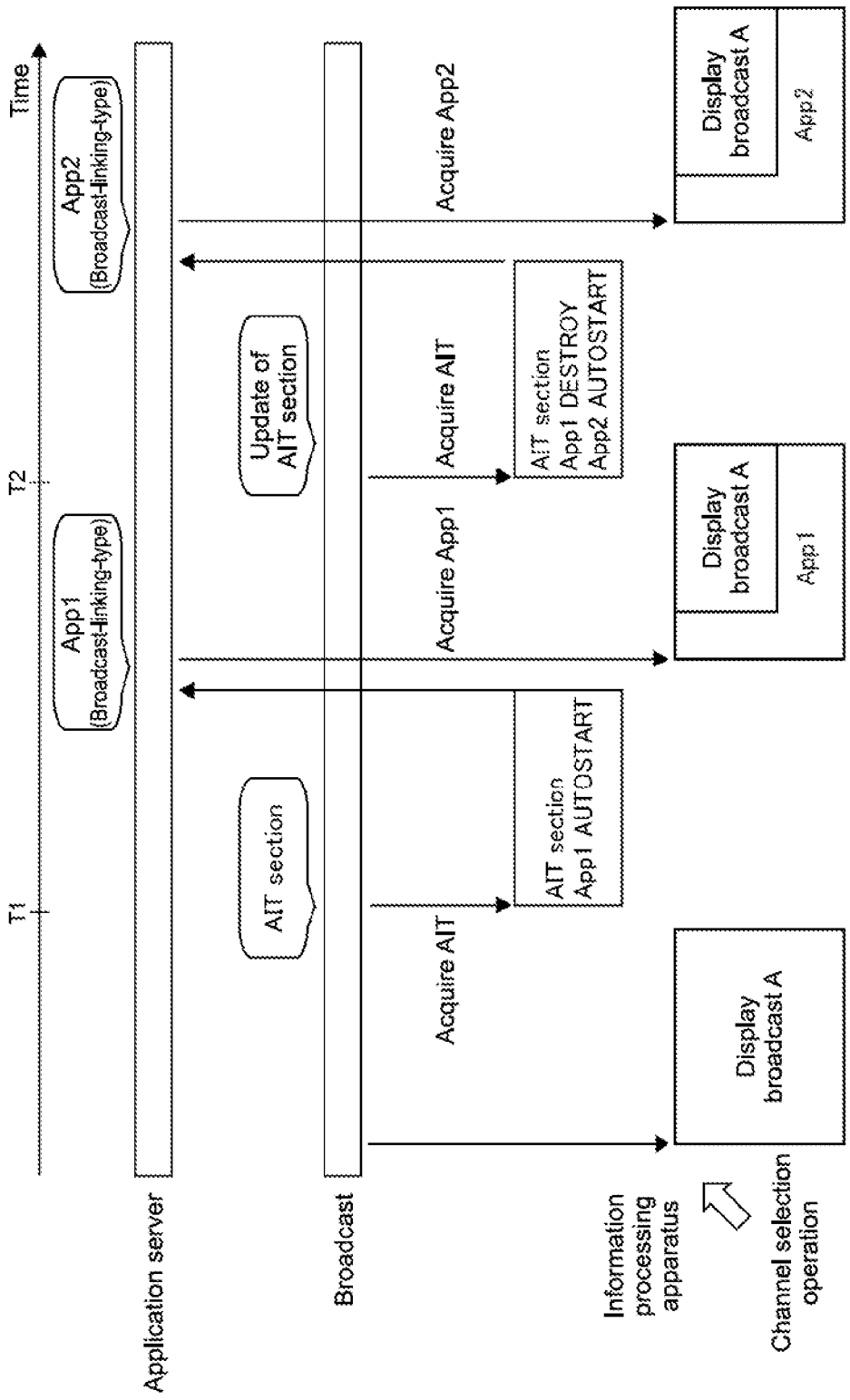
FIG. 7 is a diagram showing the operation example of the control of an application by using the AIT section.

FIG. 7 is a diagram showing the operation example of the activation of an application by using an AIT section.

Figure 8:
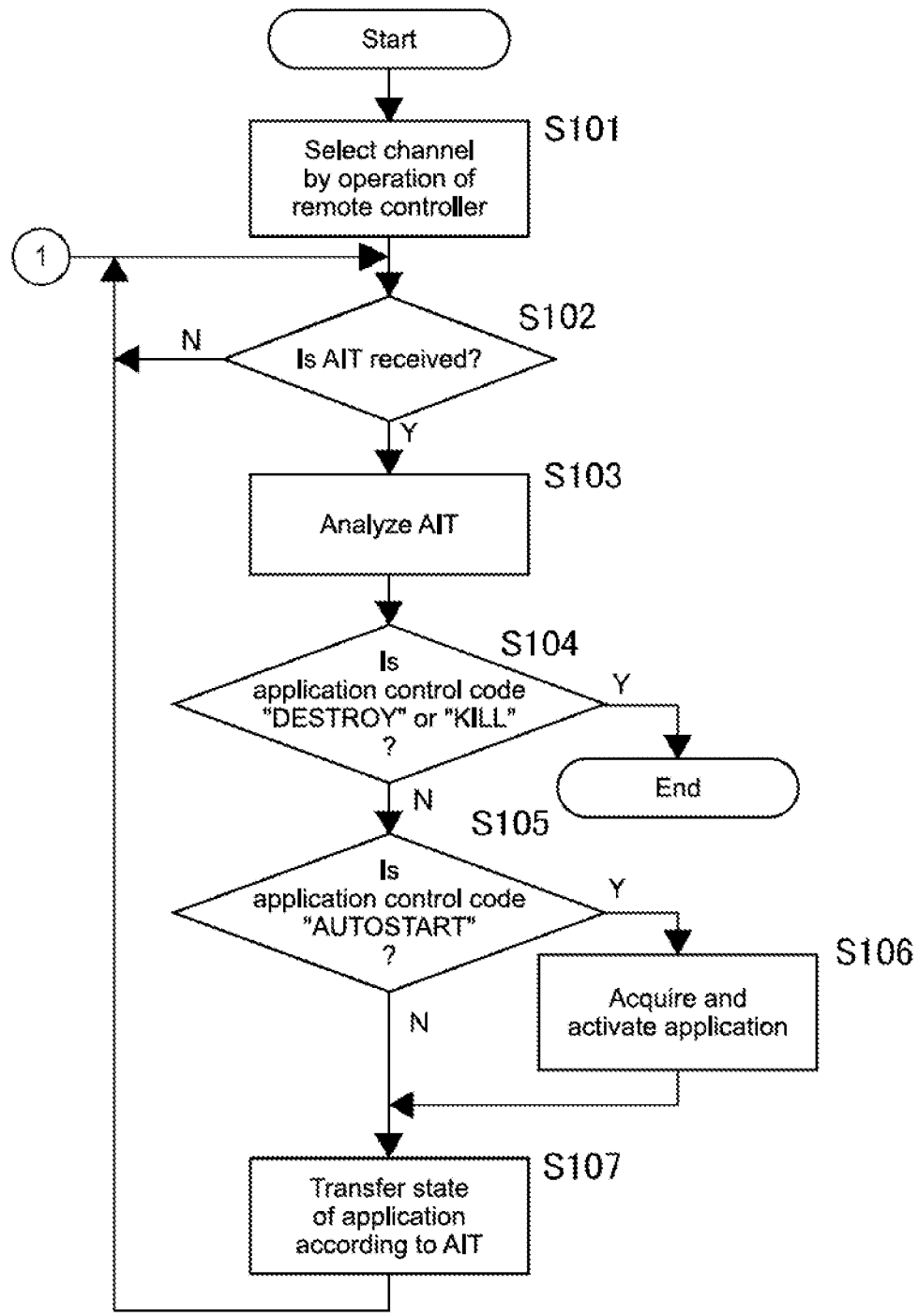
FIG. 8 is a flowchart of the operation example shown in FIG. 7.

FIG. 8 is a flowchart of the operation example shown in FIG. 7.

The information processing apparatus 700 receives broadcast content from the broadcast facility 100 whose channel is selected by the user by use of a remote controller or the like and performs decoding processing or the like on video data, voice data, subtitle data, and the like to output the broadcast content to the display unit and the speaker unit that are connected to the information processing apparatus 700 (Step S101).

Specifically, the broadcast interface 701 receives a digital broadcast signal of the broadcast content from the broadcast facility 100 whose channel is selected by the user and outputs a transport stream to the demultiplexer 702, the transport stream being obtained by performing demodulation processing or the like on the digital broadcast signal. The demultiplexer 702 separates a stream packet of the broadcast content from the transport stream and further separates the stream packet of the broadcast content into a video ES, a voice ES, and a subtitle ES. The separated video ES, voice ES, and subtitle ES are decoded in the video decoder 704, the voice decoder 705, and the subtitle decoder 706, respectively, and combined in the output processing unit 703 to be output to the display unit and the speaker unit.

In this example, at time T1, an AIT section in which an AIT on a broadcast-linking-type application App1 is stored is superimposed on the broadcast content and transmitted from the broadcast facility 100. In this AIT section, location information of the broadcast-linking-type application App1 and an application control code "AUTOSTART" instructing activation are stored. Here, it is assumed that the broadcast-linking-type application App1 is acquired from the application server 300, and thus the location information serves as information necessary for acquiring the broadcast-linking-type application App1 from the application server 300 and is constituted of communication protocol information such as HTTP (Hypertext Transfer Protocol), a URL (Uniform Resource Locator), and the like.

The demultiplexer 702 separates a packet of the broadcast-linking-type application App1 and a packet of the AIT section from the transport stream and supplies the separated packets to the application controller 708. When acquiring the AIT section (Step S102), the application controller 708 analyzes the AIT section (Step S103).

It should be noted that in this embodiment, the validation of the electronic signature is not required because a possibility that the AIT section is falsified by a malicious third party is extremely low.

In this operation example, since the "AUTOSTART" is designated as an application control code for the AIT section, the application controller 708 accesses the application server 300 based on the location information described in that AIT section to acquire the broadcast-linking-type application App1 and activates the broadcast-linking-type application App1 (N of Step S104, Y of Step S105, and Step S106). The activated broadcast-linking-type application App1 is, for example, visualized (presented) together with the video of a broadcast program A displayed on the display unit.

Subsequently, at time T2, it is assumed that the update of the AIT section occurs. The application controller 708 of the information processing apparatus 700 can be informed of the occurrence of the update of the AIT section based on a version number in the data structure of the AIT section. Here, it is assumed that the application control code "DESTROY" or "KILL" that instructs the termination of the broadcast-linking-type application App1 and the application control code "AUTOSTART" that instructs the activation of the next broadcast-linking-type application App2 are described in the updated AIT section.

When acquiring a new AIT section (Step S102), the application controller 708 of the information processing apparatus 700 terminates the broadcast-linking-type application App1 according to the application control code "DESTROY" or "KILL" for the broadcast-linking-type application App1 that is described in this AIT section (Y of Step S104 and End). Further, the application controller 708 acquires a broadcast-linking-type application App2 according to the "AUTOSTART" that is stored in the AIT section as an application control code for the broadcast-linking-type application App2 (Y of Step S105 and S106) and activates the broadcast-linking-type application App2 (Step S105). Consequently, the broadcast-linking-type application App2 is presented together with the video of the broadcast program A, instead of the broadcast-linking-type application App1.

It should be noted that in the case where an application control code other than the "AUTOSTART", the "DESTROY", and the "KILL" is described in the acquired AIT section, after the application controller 708 performs processing such as transferring the state of the broadcast-linking-type application according to that application control code (Step S107), the application controller 708 waits for the next AIT section.

In FIG. 7, although being displayed in an L-shaped form while sharing the area with the video of the broadcast program, each of the broadcast-linking-type application App1 and the broadcast-linking-type application App2 is not necessarily displayed simultaneously with the video of the broadcast program and may be displayed on the entire screen. Further, if each of the broadcast-linking-type application App1 and the broadcast-linking-type application App2 is displayed while sharing the area with the video of the broadcast program, each of the broadcast-linking-type application App1 and the broadcast-linking-type application App2 may be displayed to be separate from the video of the broadcast program vertically or horizontally. In the case where the application is displayed on the entire screen, the video of the broadcast program is not displayed, but also in this state, the tuner of the broadcast interface 701 is in the channel-selected state and the receiving state of the broadcast stream including the AIT section is continued.

As described above, as specific modes of a service in which the broadcast-linking-type application is switched by time and presented by the information processing apparatus 700, for example, the following modes are exemplified.

1. Application for providing, in the case where a moving image showing the whole of a singer's concert is transmitted as a main video through an AV stream, a sub-video obtained by capturing the situation of the concert from a different angle or zooming-in the singer and information on the singer, character data on the concert, and the like.

2. Application for providing voices and subtitles of sports live in languages of various countries.

3. Application of audio description for explaining the details of a video transmitted through an AV stream by voice for a visually impaired person.

(2. Activation of Application by Using XML-AIT)

Figure 9:
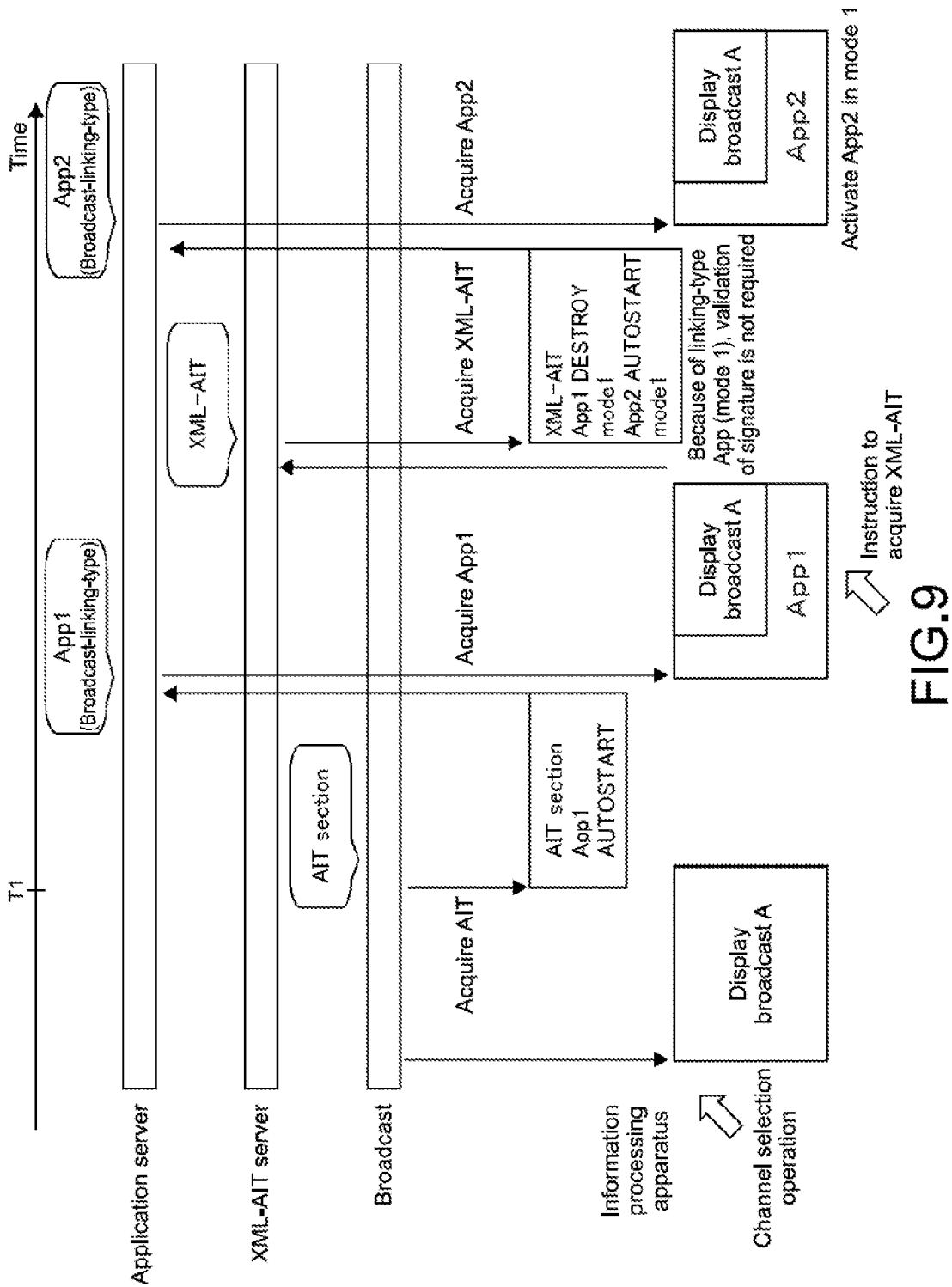
FIG. 9 is a diagram showing the operation example of the activation of an application by using the XML-AIT.

FIG. 9 is a diagram showing the operation example of the activation of an application by using the XML-AIT.

Figure 10:
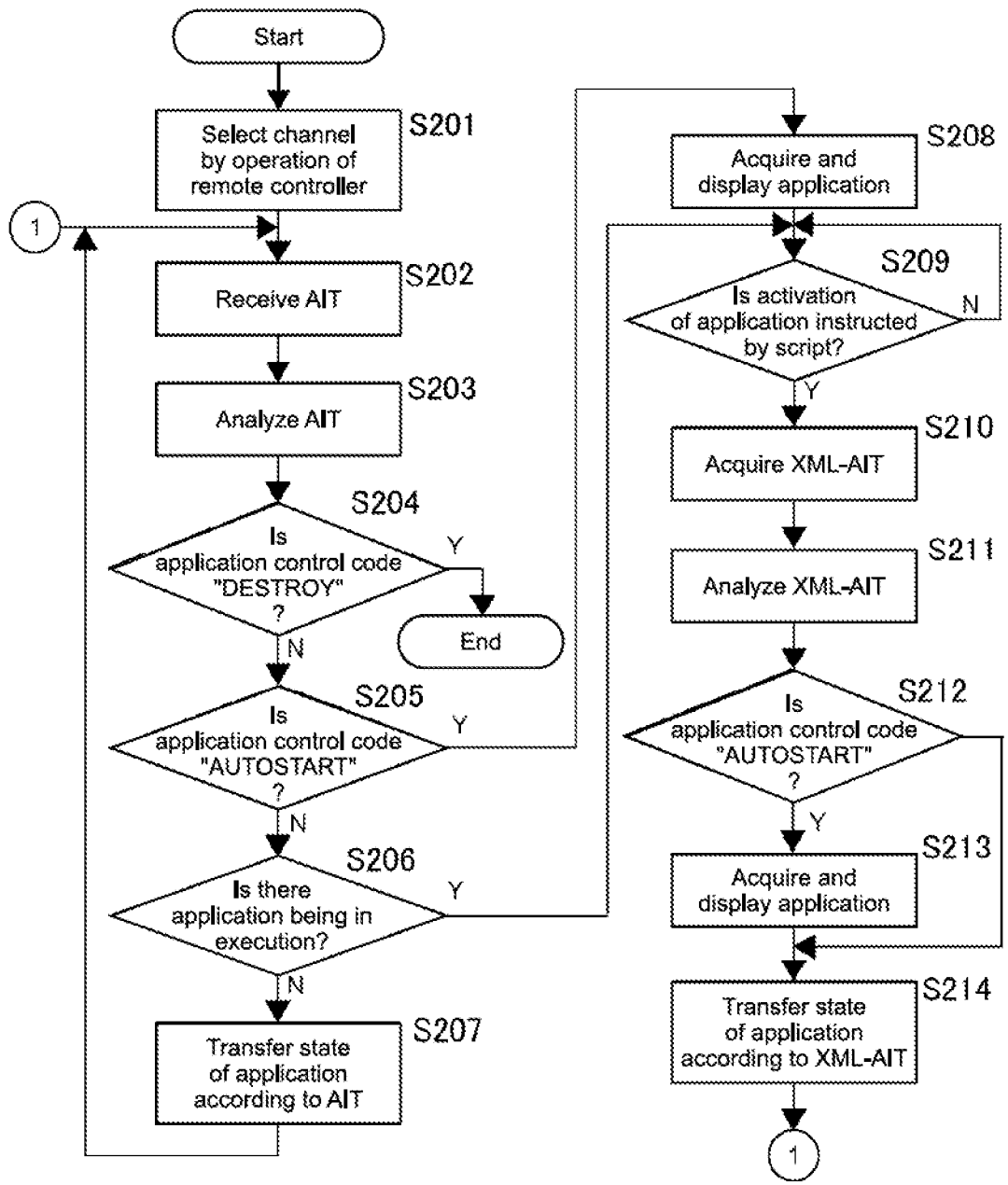
FIG. 10 is a flowchart of the operation example shown in FIG. 9.

FIG. 10 is a flowchart of the operation example shown in FIG. 9.

The operation from the channel selection of broadcast by an operation of a user using a remote controller (Step S201) to the acquisition and presentation of the broadcast-linking-type application based on the AIT section (Step S208) is the same as in "1. Activation of Application by Using AIT Section".

In this operation example, it is assumed a case where a script containing a createApplication( ) function and the like for causing the information processing apparatus 700 to acquire the XML-AIT for a broadcast-linking-type application App2 to be presented next is incorporated in the broadcast-linking-type application App1 being presented. In the createApplication( ) function, information on a communication protocol that is necessary to access the XML-AIT for the broadcast-linking-type application App2, location information of the XML-AIT, and the like are described as parameters.

During the presentation of the broadcast-linking-type application App1, when a predetermined condition such as an instruction from the user or time is established (Y of Step S209), the above-mentioned script incorporated in the broadcast-linking-type application App1 is executed, and thus the application controller 708 of the information processing apparatus 700 acquires a new XML-AIT from the XML-AIT server 400 (Step S210) and analyzes the new XML-AIT (Step S211).

In this new XML-AIT, information on the broadcast-linking-type application App1 being in execution and information on a broadcast-linking-type application App2 to be executed next are described. Here, the application control code "DESTROY" or "KILL" that instructs the termination of the broadcast-linking-type application App1 and the application mode "mode 1" are described as the information on the broadcast-linking-type application App1, and the application control code "AUTOSTART" that instructs the activation of the broadcast-linking-type application App2 and the application mode "mode 1" are described as the information on that broadcast-linking-type application App2. In other words, since each of the applications App1 and App2 is a broadcast-linking-type application, the application mode is set to the "mode 1".

Since the application mode of each of the applications App1 and App2 is the "mode 1" in the acquired XML-AIT, the application controller 708 does not require the validation of the electronic signature and starts control on the applications App1 and App2 according to the application control code described in the XML-AIT.

That is, according to the application control code "DESTROY" or "KILL" for the broadcast-linking-type application App1 that is described in the XML-AIT, the application controller 708 terminates the broadcast-linking-type application App1. Furthermore, according to the application control code "AUTOSTART" for the broadcast-linking-type application App2 that is described in the XML-AIT (Y of Step S212), the application controller 708 acquires the broadcast-linking-type application App2 from the application server 300 based on the location information of the broadcast-linking-type application App2 described in that XML-AIT and activates the broadcast-linking-type application App2 (Step S213). At that time, since the application mode of the broadcast-linking-type application App2 is set to the "mode 1", the application controller 708 activates the broadcast-linking-type application App2 in a mode capable of using the broadcast resource presenting function and the like.

(3. Activation of Application from Broadcast BML Data)

Next, the operation in the case where the application is activated from the broadcast BML data will be described.

Figure 11:
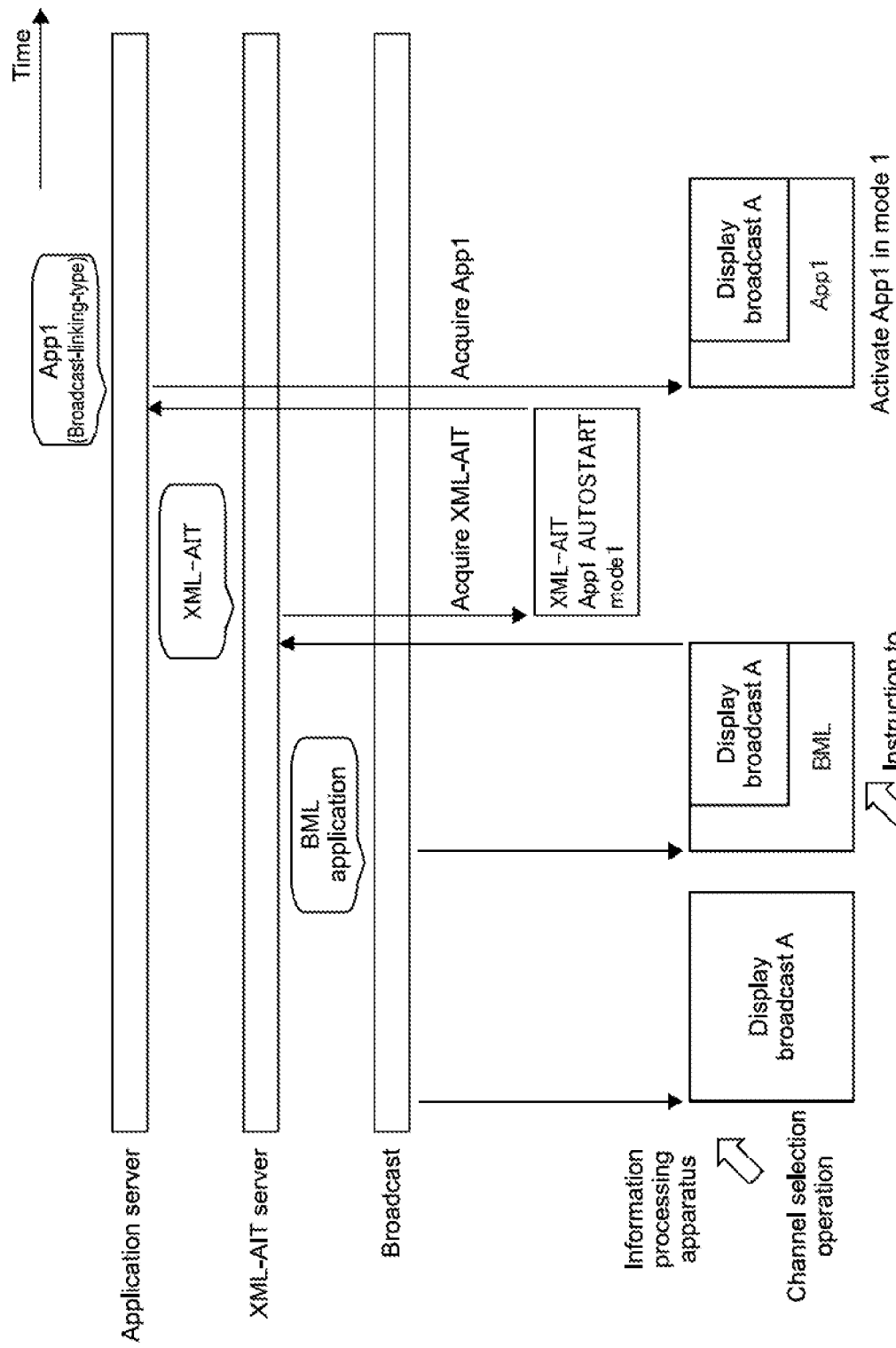
FIG. 11 is a diagram showing the operation example in the case where an application is activated from broadcast BML data.

FIG. 11 is a diagram showing the operation example in the case where an application is activated from the broadcast BML data.

Figure 12:
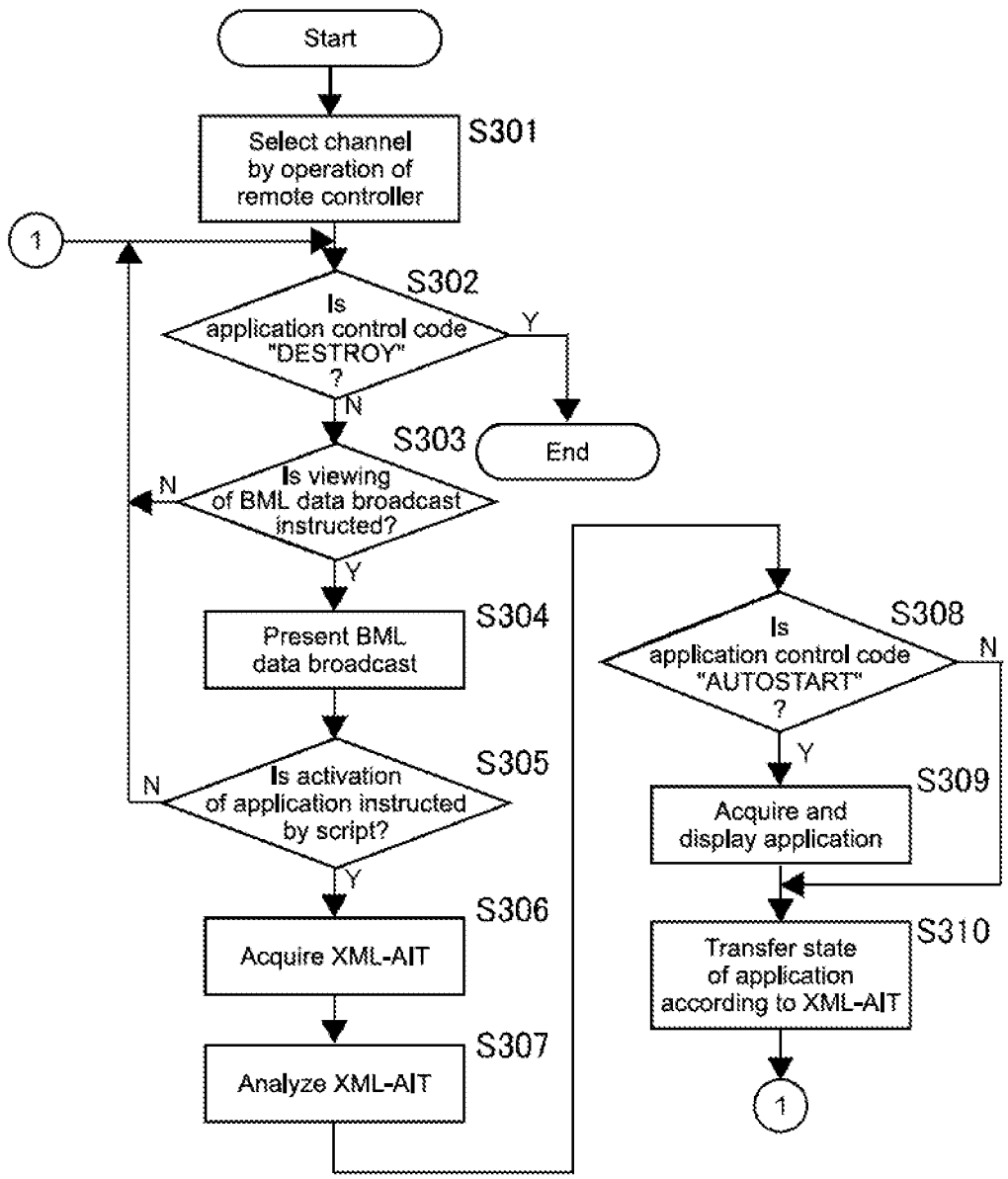
FIG. 12 is a flowchart of the operation example shown in FIG. 11.

FIG. 12 is a flowchart of the operation example shown in FIG. 11.

In this operation example, it is assumed a case where a script for causing the information processing apparatus 700 to acquire the XML-AIT for the broadcast-linking-type application App1 is incorporated in BML data broadcast. It should be noted that the data broadcast is not limited to the BML data broadcast. For example, data broadcast by another markup language capable of handling multimedia, such as MHEG (Multimedia and Hypermedia Experts Group), can also be adopted.

The information processing apparatus 700 receives broadcast content from the broadcast facility 100 whose channel is selected by the user by use of a remote controller or the like and performs decoding processing or the like on video data, voice data, subtitle data, and the like to output AV content (broadcast program) to the display unit and the speaker unit that are connected to the information processing apparatus 700 (Step S301).

During the output of the AV content (broadcast program), when an instruction to reproduce the data broadcast is input by the user by use of the remote controller or the like (Step S303), the BML data broadcast transmitted accompanying the AV content (broadcast program) being viewed is presented together with the AV content (broadcast program) (Step S304).

During the presentation of the BML data broadcast, when a predetermined condition such as an instruction from the user or time is established (Y of Step S305), the above-mentioned script incorporated in the BML data broadcast is executed, and thus the application controller 708 of the information processing apparatus 700 acquires the XML-AIT for the broadcast-linking-type application App1 from the XML-AIT server 400 (Step S306) and analyzes the XML-AIT (Step S307).

In this XML-AIT for the broadcast-linking-type application App1, the "AUTOSTART" is designated as an application control code and the "mode 1" is described as an application mode.

Since the application mode of the broadcast-linking-type application App1 is the "mode 1", the application controller 708 does not require the validation of the electronic signature, accesses the application server 300 based on the location information described in that XML-AIT to acquire the broadcast-linking-type application App1, and activates the broadcast-linking-type application App1 (Y of Step S308 and Step S309). At that time, since the application mode of the broadcast-linking-type application App1 is the "mode 1", the application controller 708 activates the broadcast-linking-type application App1 in a mode capable of using the broadcast resource presenting function.

It should be noted that the determination on whether the validation of the electronic signature is required or not is not necessarily performed in only the application mode. For example, in the case where the acquired XML-AIT is one acquired based on a URL described in a BML document that is less probably falsified, it is determined that the validation of the electronic signature is not required. Conversely, in the case where the XML-AIT is one acquired via a transmission system other than broadcast, such as an application launcher to be described later, it is determined that the validation of the electronic signature is required.

After that, in the case where the application control code "DESTROY" or "KILL" that instructs the termination of the broadcast-linking-type application App1 is described in the newly acquired XML-AIT, the application controller 708 of the information processing apparatus 700 terminates the broadcast-linking-type application App1 according to this application control code (Y of Step S302).

Further, in the case where an application control code other than the "AUTOSTART", the "DESTROY", and the "KILL" is described in the newly acquired XML-AIT, after the application controller 708 of the information processing apparatus 700 performs processing such as transferring the state of the broadcast-linking-type application App1 according to that application control code (Step S310), the application controller 708 waits for the next XML-AIT.

(4. Activation of Broadcast-unlinking-type Application)

Next, the operation on the activation of a broadcast-unlinking-type application will be described.

Figure 13:
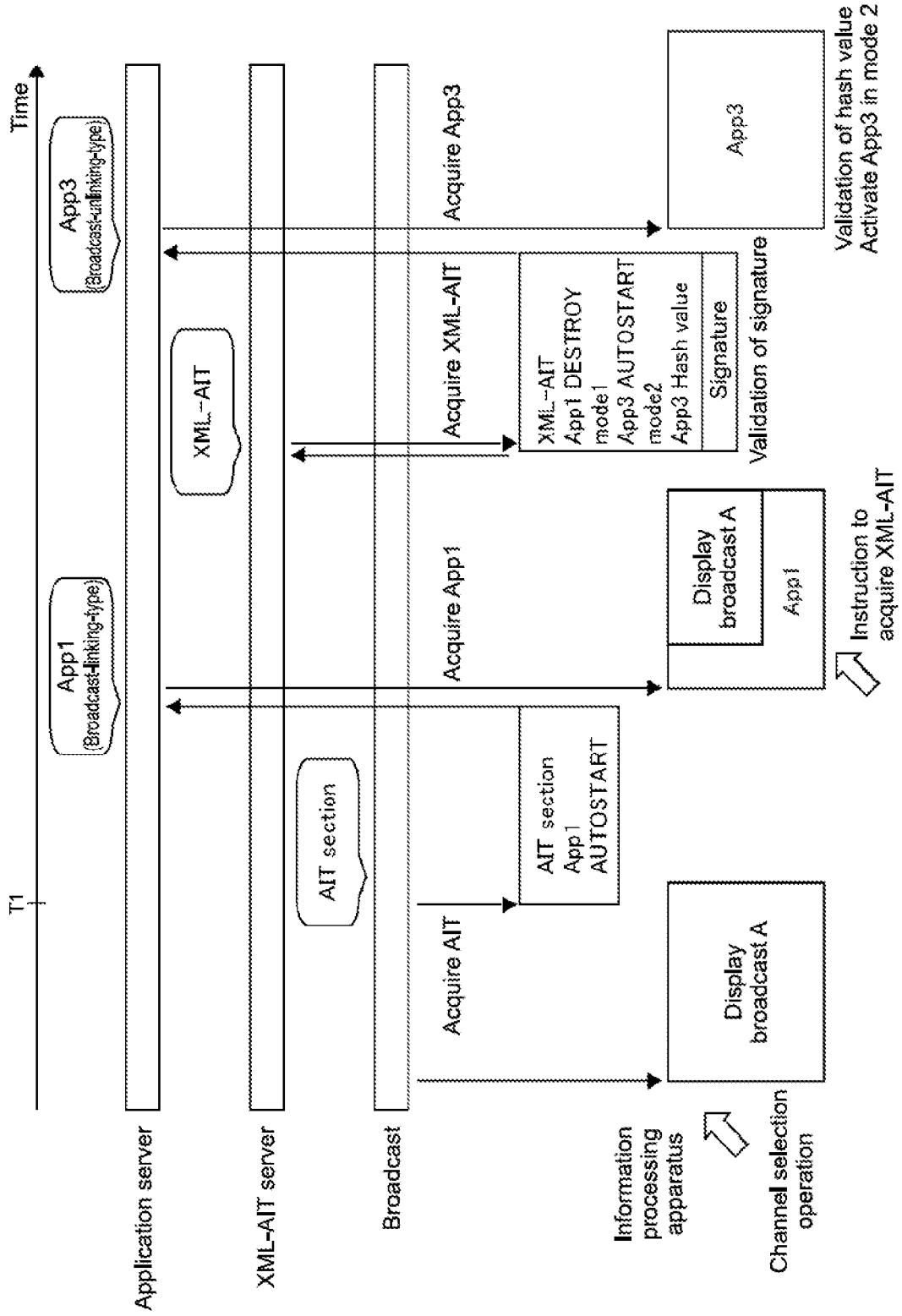
FIG. 13 is a diagram showing the operation example in the case where after a broadcast-linking-type application is activated, a broadcast-unlinking-type application is activated by the XML-AIT.

FIG. 13 is a diagram showing the operation example in the case where after the broadcast-linking-type application App1 is activated, a broadcast-unlinking-type application App3 is activated by the XML-AIT.

Figure 14:
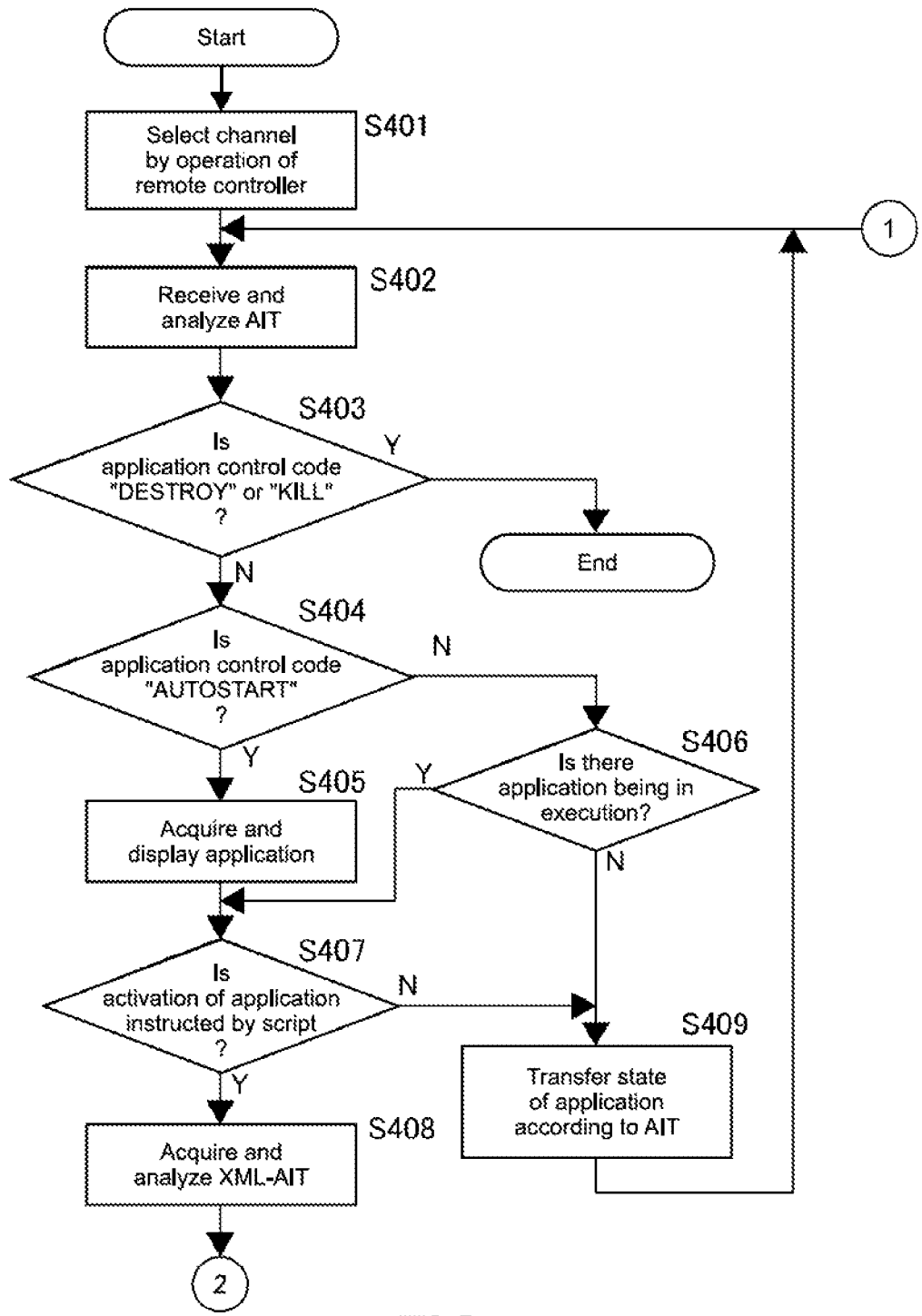
FIG. 14 is a flowchart of the operation example shown in FIG. 13.
Figure 15:
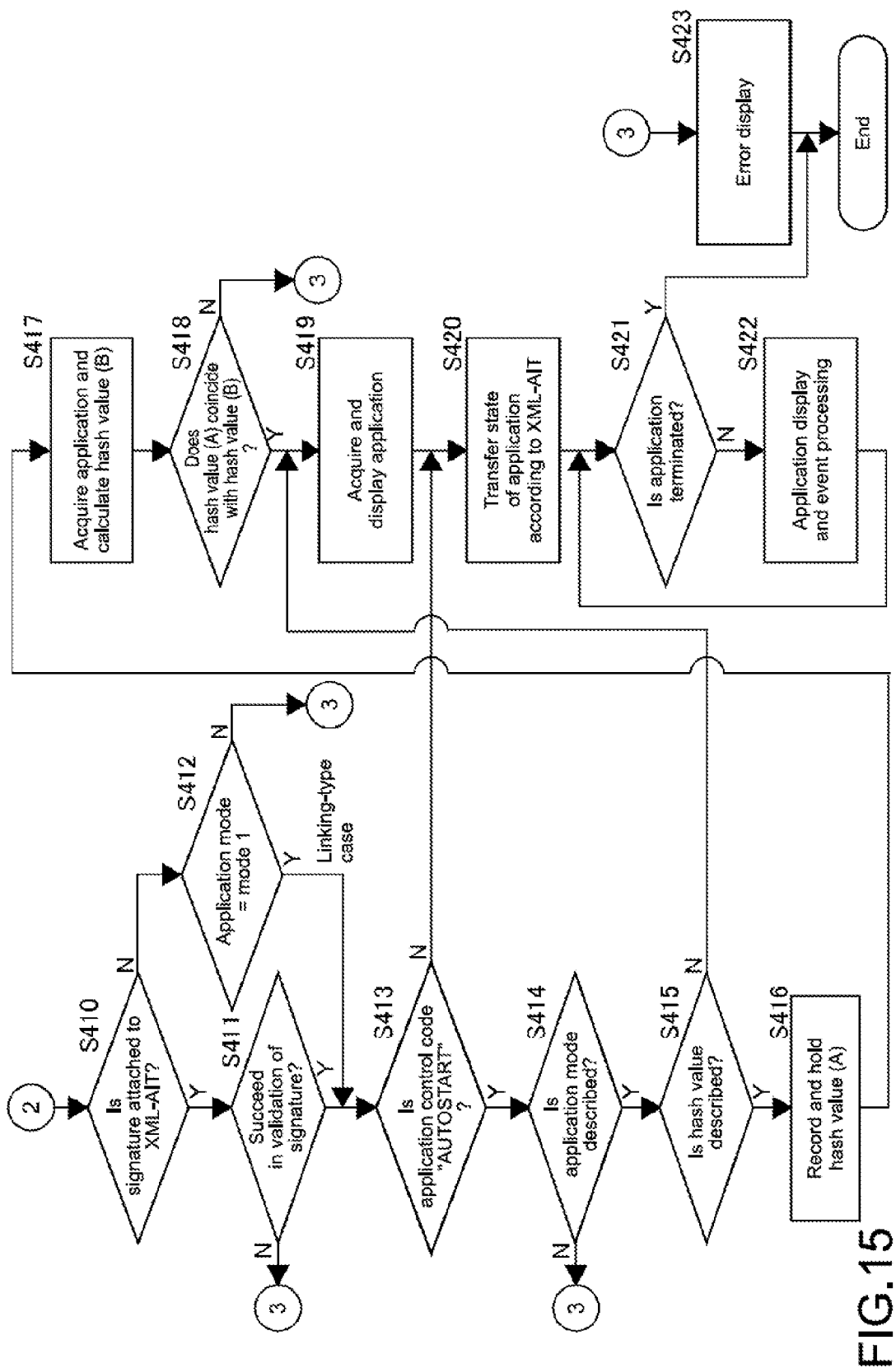
FIG. 15 is a flowchart of the operation example shown in FIG. 13.

FIGS. 14 and 15 are each a flowchart of the operation example shown in FIG. 13.

The operation from the channel selection of broadcast by an operation of a remote controller (Step S401) to the acquisition and presentation of the broadcast-linking-type application based on the AIT section (Step S405) is the same as in "1. Activation of Application by Using AIT Section".

In this operation example, it is assumed a case where a script containing a createApplication( ) function for causing the information processing apparatus 700 to acquire the XML-AIT for the broadcast-unlinking-type application App3 is incorporated in the broadcast-linking-type application App1.

During the presentation of the broadcast-linking-type application App1, when a predetermined condition such as an instruction from the user or time is established (Y of Step S407), the above-mentioned script incorporated in the broadcast-linking-type application App1 is executed, and thus the application controller 708 of the information processing apparatus 700 acquires the XML-AIT for the broadcast-unlinking-type application App3 from the XML-AIT server 400 and analyzes the XML-AIT (Step S408).

Here, in general, the broadcast-unlinking-type application is provided by an application provider that is different from a broadcaster. For that reason, as an application mode, the "mode 2" is set for the XML-AIT of the broadcast-unlinking-type application. So, an electronic signature is normally supposed to be attached to the XML-AIT, and when the XML-AIT is used on the information processing apparatus 700 side, the validation of the electronic signature is an indispensable condition.

Further, in this XML-AIT, the application control code "DESTROY" or "KILL" that instructs the termination of the broadcast-linking-type application App1 and the application mode "mode 1" are described as the information on the broadcast-linking-type application App1 being executed, and the application control code "AUTOSTART" that instructs the activation of the broadcast-unlinking-type application App3 and the application mode "mode 2" are described as information on the broadcast-unlinking-type application App3 to be executed next. Furthermore, in this XML-AIT, a hash value (first representative value) of the broadcast-unlinking-type application App3 is described.

The application controller 708 of the information processing apparatus 700 determines whether an electronic signature is attached to the acquired XML-AIT or not (Step S410). In the case where an electronic signature is attached to the XML-AIT, the application controller 708 determines that the validation of the electronic signature is required and validates the electronic signature (Step S411).

Alternatively, in the case where an electronic signature is not attached to the XML-AIT (N of Step S410), the application controller 708 checks whether the application mode described in the XML-AIT is the "mode 1" having a value of a mode in which the validation of the electronic signature is not required (Step S412). In the case where the application mode is the "mode 1" in this check, it is determined that the validation of the electronic signature is not required.

In the case where the validation of the electronic signature fails, an error is displayed (Step S423). In the case where the validation of the electronic signature succeeds (Y of Step S411) or it is determined that the validation of the electronic signature is not required (Y of Step S412), the application controller 708 determines whether the application control code described in the XML-AIT is the "AUTOSTART" or not (Step S413). In the case where the application control code is the "AUTOSTART", the application controller 708 determines whether the value of the application mode and the hash value are described in the XML-AIT or not (Steps S414 and S415). In the case where the value of the application mode is not set in the XML-AIT, an error is displayed (Step S423). In the case where the value of the application mode is described in the XML-AIT, the application controller 708 holds the hash value (A) (first representative value) described in the XML-AIT (Step S416).

Next, the application controller 708 acquires the broadcast-unlinking-type application App3 from the application server 300 based on the location information of the broadcast-unlinking-type application App3 that is described in the XML-AIT and calculates a hash value (B) (second representative value) of the broadcast-unlinking-type application App3 by a hash algorithm that indicates a method of calculating the hash value described in the XML-AIT (Step S417).

Next, the application controller 708 compares the hash value (A) with the hash value (B) (Step S418). In the case where the hash value (A) coincides with the hash value (B), since the application mode of the broadcast-unlinking-type application App3 is the "mode 2", the application controller 708 activates the broadcast-unlinking-type application App3 in a mode in which the broadcast resource presenting function is unavailable (Step S419). In the case where the hash value (A) does not coincide with the hash value (B), an error is displayed (Step S423). After that, according to an application control code described in a new XML-AIT, in addition to the control of the transfer of a state or the termination of the broadcast-unlinking-type application App3, an operation of a remote controller by the user and event processing by an event message are performed (Steps S420, S421, and S422).

(5. Activation of Broadcast-unlinking-type Application from Application Launcher)

Next, the operation in the case where the broadcast-unlinking-type application is activated from an application launcher will be described.

Figure 16:
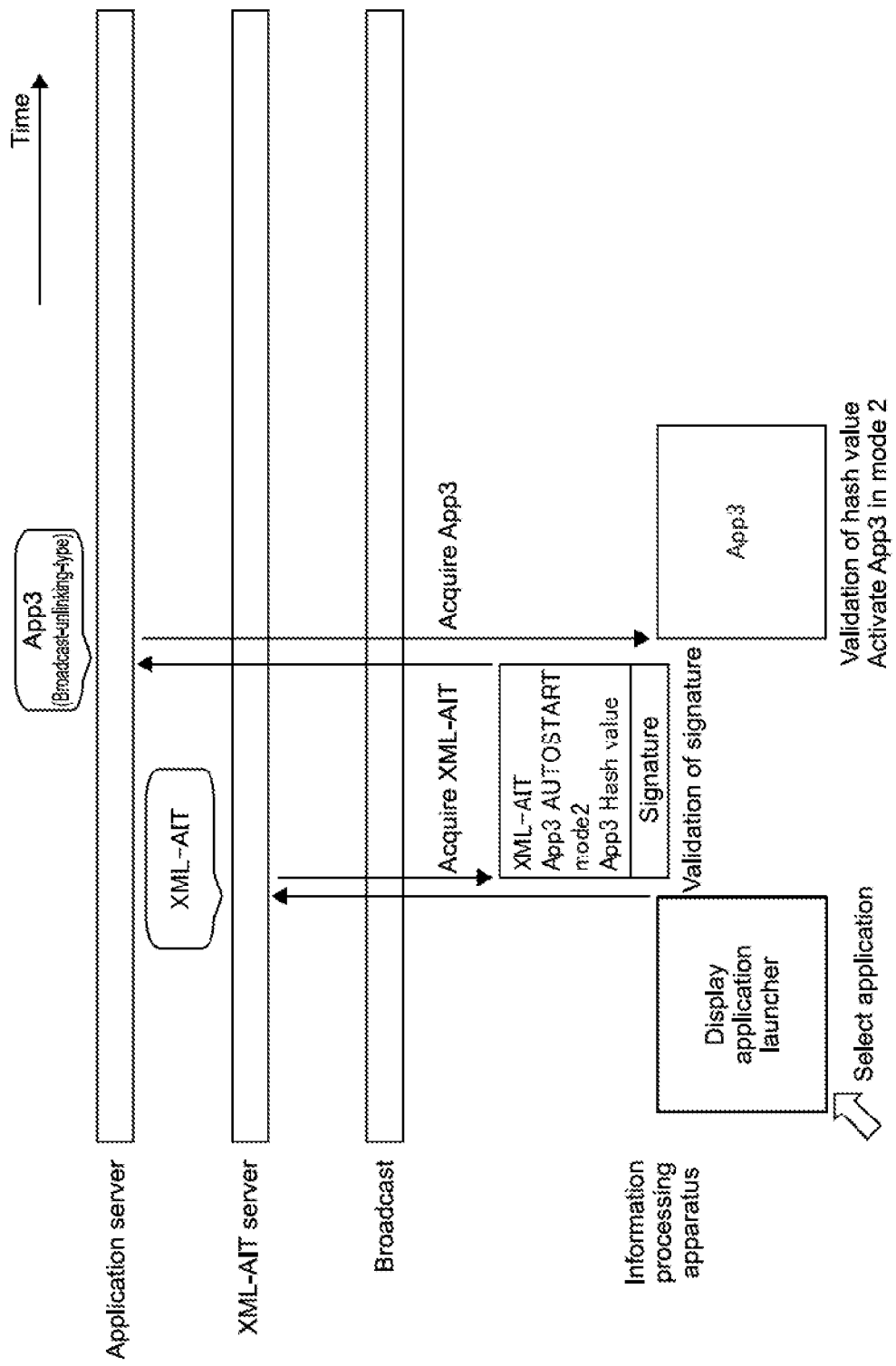
FIG. 16 is a diagram showing an operation example in the case where a broadcast-unlinking-type application is activated from an application launcher.

FIG. 16 is a diagram showing an operation example in the case where the broadcast-unlinking-type application is activated from the application launcher.

Figure 17:
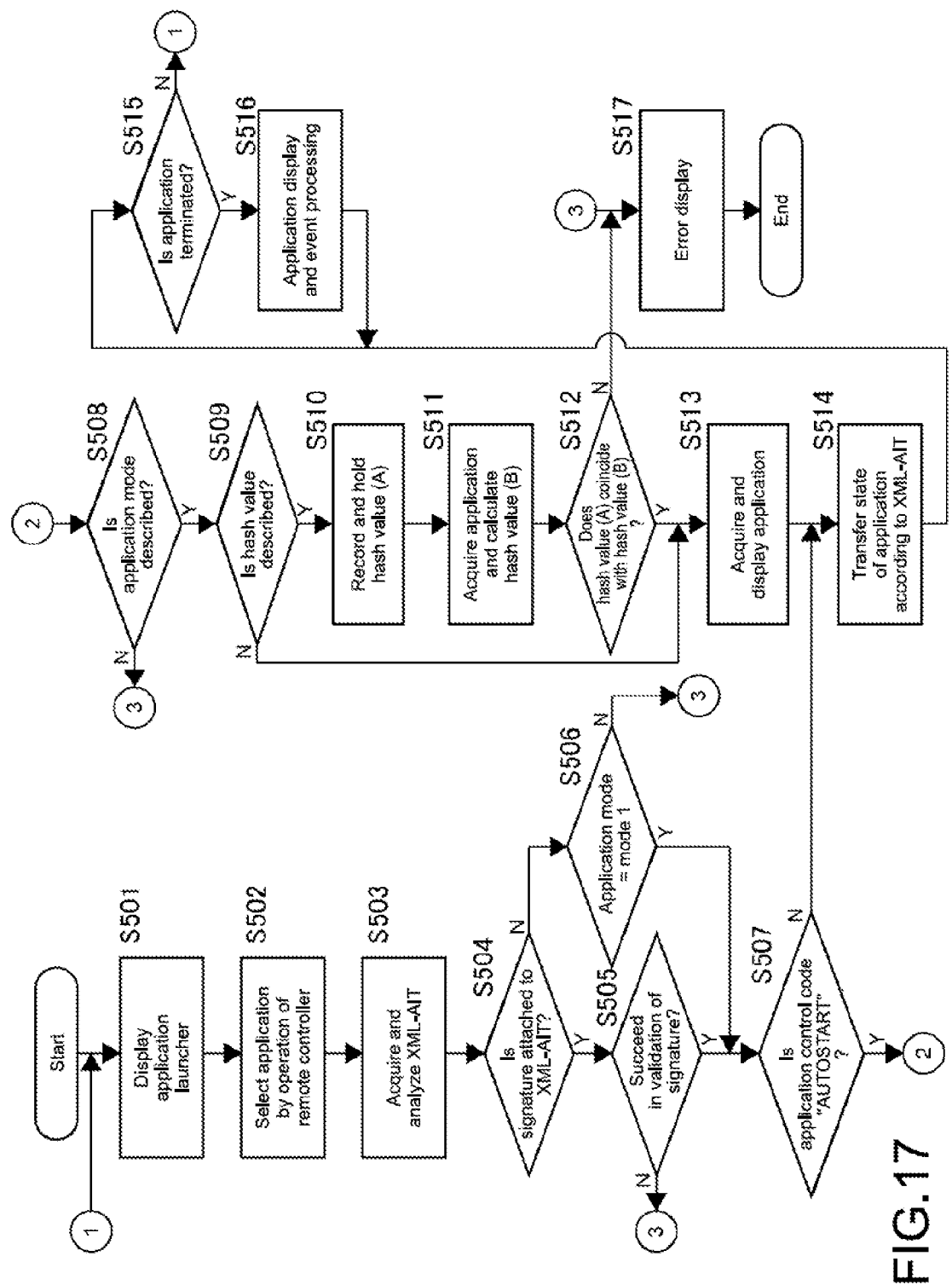
FIG. 17 is a flowchart of the operation example shown in FIG. 16.

FIG. 17 is a flowchart of the operation example shown in FIG. 16.

The information processing apparatus 700 displays an application launcher screen selected by the user by use of a remote controller or the like. The application launcher screen is achieved by a document in HTML5 or the like presented by an HTML browser or a so-called resident application, which is implemented in the information processing apparatus 700. On the application launcher screen, an application menu and the like are displayed (Step S501). The user can select an application desired to be presented by using a remote controller, for example. In the individual menus of the application, a script for causing the information processing apparatus 700 to acquire an XML-AIT for an application corresponding to the menu is incorporated.

When an optional broadcast-unlinking-type application App3 is selected by an operation of a user using a remote controller on the application menu displayed on the launcher screen (Step S502), the above-mentioned script corresponding to that application is executed, and thus the application controller 708 of the information processing apparatus 700 acquires the XML-AIT for that application from the XML-AIT server 400 and analyzes the XML-AIT (Step S503).

Here, in general, the broadcast-unlinking-type application that can be selected from the application launcher screen is provided by an application provider that is different from a broadcaster. For that reason, as an application mode, the "mode 2" is set for the XML-AIT of the broadcast-unlinking-type application. So, an electronic signature is normally supposed to be attached to the XML-AIT, and when the XML-AIT is used on the information processing apparatus 700 side, the validation of this electronic signature is an indispensable condition.

Further, in this XML-AIT, the application control code "AUTOSTART" that instructs the activation of the broadcast-unlinking-type application App3 and the application mode "mode 2" are described as information on the broadcast-unlinking-type application App3. Furthermore, in this XML-AIT, a hash value of the broadcast-unlinking-type application App3 is described.

The application controller 708 of the information processing apparatus 700 determines whether an electronic signature is attached to the acquired XML-AIT or not (Step S504). In the case where an electronic signature is attached to the XML-AIT, the application controller 708 determines that the validation of the electronic signature is required. Subsequent operations are the same as those in "4. Activation of Broadcast-Unlinking-Type Application".

(6. Generation and Validation of Electronic Signature and Hash Value)

Next, the generation and validation of the electronic signature and the hash value will be described.

The XML-AIT server 400 and the application server 300 may be one server or separate servers. Here, the XML-AIT server 400 and the application server 300 are collectively referred to as "server". The server is a device having a configuration of a typical computer. So, the server is constituted of a CPU, a main memory, a storage device such as a HDD, input devices such as a mouse and a keyboard, a display unit such as a liquid crystal display, and the like. The main memory and the storage device store an OS (Operating System), software such as an application program for the server, an application provided to the information processing apparatus 700 (broadcast-linking-type application, broadcast-unlinking-type application), an XML-AIT file for each application, a signature generation key, and the like. As the application program for the server, a program for generating an electronic signature and a hash value, and the like are included.

Figure 18:
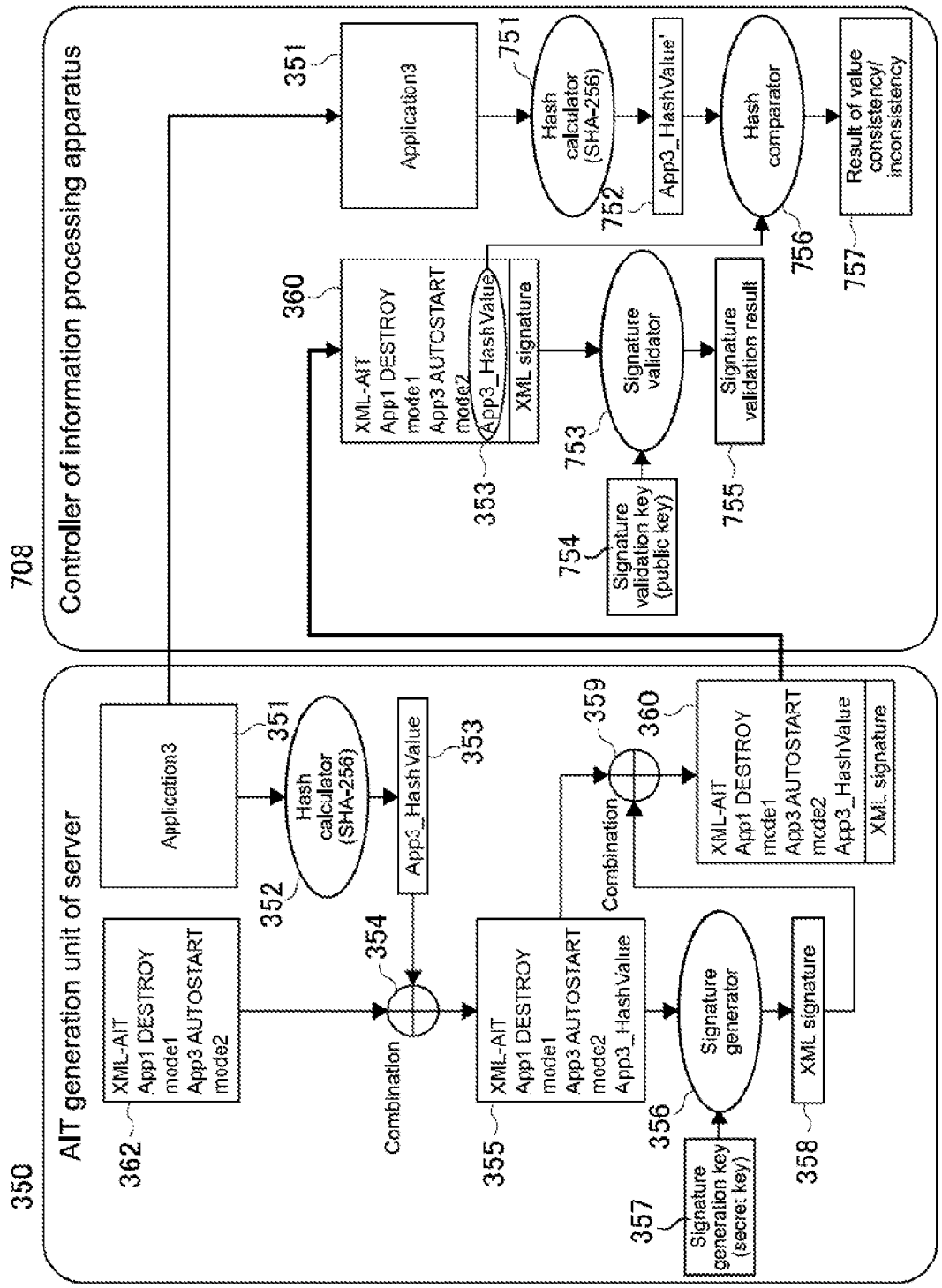
FIG. 18 is a diagram for describing a method of generating and validating an electronic signature and a hash value.

FIG. 18 is a diagram for describing a method of generating an electronic signature and a hash value in the server and a method of validating the electronic signature and the hash value in the information processing apparatus 700.

The server includes an AIT generation unit 350. The AIT generation unit 350 is specifically achieved by a program for generating an electronic signature and a hash value, which is loaded to the main memory, and a CPU that executes the program.

The AIT generation unit 350 performs the following processing.

1. The AIT generation unit 350 uses a predetermined hash calculator 352 to calculate a hash value 353 from the substance (binary code) of the application 351. As a hash algorithm, for example, an SHA-1, an SHA-2, and the like that are standardized in FIPS PUB 180-1 and 180-2 are exemplified.

2. The AIT generation unit 350 combines (354) the hash value 353 with an XML-AIT 362 of the application 351 and generates a hash-value-added XML-AIT 355.

3. The AIT generation unit 350 uses a hash function for a signature to generate a digest for the hash-value-added XML-AIT 355 in the signature generator 356, encrypts the digest with a signature generation key (secret key) 357, and generates an XML signature 358.

4. The AIT generation unit 350 adds (359) the XML signature 358 to the hash-value-added XML-AIT 355 and generates an electronic-signature-added XML-AIT 360.

5. Subsequently, the electronic-signature-added XML-AIT 360 is provided to the information processing apparatus 700.

The controller 708 of the information processing apparatus 700 performs the following processing.

1. The controller 708 extracts an XML signature from the electronic-signature-added XML-AIT 360 acquired from the server in the signature generator 753 and validates the XML signature with a signature validation key (public key) 754 to acquire a signature validation result 755.

2. In the case of succeeding in the validation of the XML signature, the controller 708 uses a predetermined hash calculator 751 (hash function) to calculate a hash value 752 from the substance (binary code) of the application 351 acquired from the server. The hash function used here has to be the same as that of the hash calculator 352 of the AIT generation unit 350 of the server. So, the controller 708 checks the hash algorithm described in the electronic-signature-added XML-AIT 360 acquired from the server and determines whether that hash algorithm has a consistency with the hash algorithm of the hash calculator 751 (hash function). If the inconsistency of the hash algorithm is determined, the controller 708 switches the hash calculator 751 (hash function) to cause the hash algorithm to be consistent with that of the hash calculator 352 of the AIT generation unit 350 of the server.

3. The controller 708 uses a hash comparator 756 to compare the hash value 353 extracted from the electronic-signature-added XML-AIT 360 acquired from the server with the hash value 752 and obtains a result of consistency/inconsistency 757.

4. In the case of failing in the validation of the XML signature or in the case of succeeding in the validation of the XML signature but causing inconsistency between the hash value 353 and the hash value 752, the processing is considered to be an error and terminated.

[Effects Etc. of Embodiment]

In this embodiment, the following effects are obtained.

1. For example, in the service in which an XML-AIT and an application are transmitted through a communication path such as an Internet network, the XML-AIT and the application can be transmitted to the information processing apparatus 700 while keeping their reliability. This can prevent a falsification of the XML-AIT and the application by a malicious third party and allows the application to be safely used in the information processing apparatus 700.

2. More specifically, since the hash value of the application is described in the XML-AIT and provided to the information processing apparatus 700, the information processing apparatus 700 can determine the correctness of the application by comparing the hash value calculated for the application acquired from the application server 300 with the hash value transmitted by the XML-AIT.

3. Further, since the electronic signature is attached to the XML-AIT containing the hash value and the information processing apparatus 700 cannot acquire the application if the information processing apparatus 700 does not succeed in the validation of this electronic signature, it is possible to prevent an unauthorized application from being executed in the information processing apparatus 700 by the falsification of the XML-AIT and the like.

4. Since the application mode can be described in the XML-AIT, the function available to the application can be controlled. Furthermore, the information processing apparatus 700 can uniquely know whether the validation of the electronic signature is required or not based on the application mode and the like described in the XML-AIT. Consequently, for example, the validation of the electronic signature can be skipped regarding the XML-AIT for an application produced by a broadcaster, and thus the improvement in total speed can be expected.

MODIFIED EXAMPLE ETC.

Figure 19:
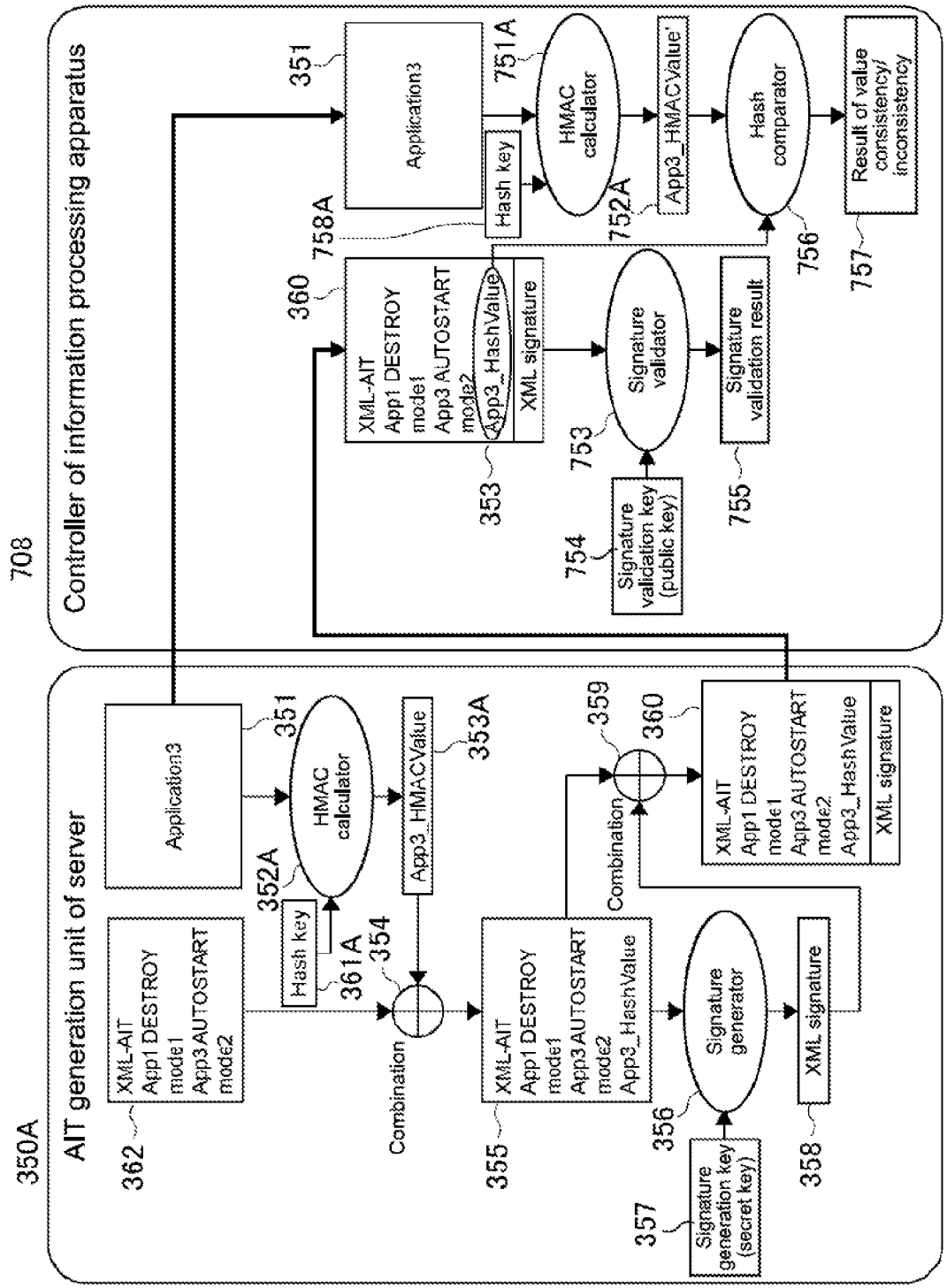
FIG. 19 is a diagram for describing a modified example of a method of generating and validating an electronic signature and a hash value.

It should be noted that although the hash function is used to calculate the hash value of the application in the above embodiment, as its modified example, a method of using HMAC (Keyed-Hashing for Message Authentication) calculators 352A and 751A is exemplified as shown in FIG. 19. The HMAC calculators 352A and 751A use hash functions of an SHA-1 and an SHA-2, and the like in combination with secret shared keys (hash key) 361A and 758A to calculate hash values 353A and 752A. Other processing is the same as that in the above embodiment.

Further, in the embodiment described above, the case where the hash value is used as a representative value of the application has been described. However, a method other than the hash calculation may be adopted as long as the value can be obtained from a binary code of the application by a predetermined calculation.

The embodiment in which the standard of the HbbTV is assumed has been described, but the present technology is not limited to the assumption of the standard of the HbbTV.

In addition to the above, the present technology is not limited to the above-mentioned embodiment and can be variously modified without departing from the gist of the present invention as a matter of course.

DESCRIPTION OF SYMBOLS

1 information processing system
11, 21 application control code
22 application mode descriptor
23 application hash descriptor
100 broadcast facility
200 first network
300 application server
350 AIT generation unit
351 application
352 hash calculator
353 hash value
355 AIT
356 signature generator
357 signature generation key
358 XML signature
360 AIT
400 AIT server
600 second network
700 information processing apparatus
701 broadcast interface
702 demultiplexer
703 output processing unit
704 video decoder
705 voice decoder
706 subtitle decoder
707 communication interface
708 application controller
751 hash calculator
752 hash value
753 signature generator
754 signature validation key
755 signature validation result
756 hash comparator

The invention claimed is:

1. An information processing apparatus, comprising:
a broadcast interface to receive broadcast content from a broadcast facility;
a processing device, having a demultiplexer and a number of decoders, to process the received broadcast content;
a communication interface to communicate with an external server by way of a network; and
a controller that is capable of acquiring from the broadcast facility an application to which an electronic signature is attached and in which location information necessary for acquiring from the external server an application processed together with the broadcast content is stored, validating the electronic signature, and acquiring the application from the external server by way of the network based on the location information in a case of succeeding at least in the validation, in which application mode information is associated with the application, the application mode information representing a first mode or a second mode, the first mode being indicative of a broadcast linking type application which is capable of using a broadcast function and the second mode being indicative of a broadcast non-linking type application which is incapable of using the broadcast function, in which the controller is configured to determine whether validation of the electronic signature is required or not based on whether the mode information represents the first mode or the second mode, such that the controller determines that the validation of the electronic signature is not required when the application mode information represents the first mode and the controller determines that the validation of the electronic signature is required when the application mode information represents the second mode, in which the broadcast facility is separate from the external server, and in which the information processing apparatus is separate from the broadcast facility and the external server.

2. The information processing apparatus according to claim 1, wherein a first representative value that is calculated from the application by a calculation and represents the application is stored, and the controller calculates a second representative value for the acquired application, the second representative value representing the application by the calculation, and compares the first representative value and the second representative value to validate the application.

3. An information processing method, comprising: by a controller of an information processing apparatus, acquiring, from a broadcast facility, an application to which an electronic signature is attached and in which location information necessary for acquiring from the external server an application processed together with broadcast content is stored;

validating the electronic signature; and acquiring, from the external server by way of a network, the application based on the location information in a case of succeeding at least in the validation, in which application mode information is associated with the application, the application mode information representing a first mode or a second mode, the first mode being indicative of a broadcast linking type application which is capable of using a broadcast function and the second mode being indicative of a broadcast non-linking type application which is incapable of using the broadcast function, said method further comprising by the controller determining whether validation of the electronic signature is required or not based on whether the mode information represents the first mode or the second mode, such that the controller determines that the validation of the electronic signature is not required when the application mode information represents the first mode and the controller determines that the validation of the electronic signature is required when the application mode information represents the second mode, in which the broadcast facility is separate from the external server, and in which the information processing apparatus is separate from the broadcast facility and the external server.

4. A non-transitory computer readable storage device having stored thereon a program when executed causes a computer to function as:

a broadcast interface that receives broadcast content from a broadcast facility;

a processing device to process the received broadcast content;

a communication interface to communicate with an external server by way of a network; and a controller that is capable of acquiring from the broadcast facility an application to which an electronic signature is attached and in which location information necessary for acquiring from the external server an application processed together with the broadcast content is stored, validating the electronic signature, and acquiring the application from the external server by way of the network based on the location information in a case of succeeding at least in the validation, in which application mode information is associated with the application, the application mode information representing a first mode or a second mode, the first mode being indicative of a broadcast linking type application which is capable of using a broadcast function and the second mode being indicative of a broadcast non-linking type application which is incapable of using the broadcast function, in which the controller is configured to determine whether validation of the electronic signature is required or not based whether the mode information represents the first mode or the second mode, such that the controller determines that the validation of the electronic signature is not required when the application mode information represents the first mode and the controller determines that the validation of the electronic signature is required when the application mode information represents the second mode, in which the broadcast facility is separate from the external server, and in which the information processing apparatus is separate from the broadcast facility and the external server.

5. An information processing apparatus, comprising:

a broadcast interface to receive a broadcast signal from a broadcast facility, said broadcast signal having broadcast content and information of an application;

a demultiplexer to obtain the information of the application from the received broadcast signal;

a communication interface to communicate with an external server by way of an Internet network; and a controller to (i) obtain from the information of the application location information indicative of a location in the external server whereat an application is stored, (ii) validate an electronic signature provided with the information of the application, and (iii) acquire the application from the external server by way of the Internet network based on the location information when validation of the electronic signature is successful, in which application mode information is associated with the application, the application mode information representing a first mode or a second mode, the first mode being indicative of a broadcast linking type application which is capable of using a broadcast function and the second mode being indicative of a broadcast non-linking type application which is incapable of using the broadcast function, in which the controller is configured to determine whether validation of the electronic signature is required or not based whether the mode information represents the first mode or the second mode, such that the controller determines that the validation of the electronic signature is not required when the application mode information represents the first mode and the controller determines that the validation of the electronic signature is required when the application mode information represents the second mode, in which the broadcast facility is separate from the external server, and in which the information processing apparatus is separate from the broadcast facility and the external server.

* * * * *